US011698120B2

United States Patent
Montagna

(10) Patent No.: US 11,698,120 B2
(45) Date of Patent: Jul. 11, 2023

(54) DAMPER ASSEMBLY

(71) Applicant: DRiV Automotive Inc., Lake Foresrt, IL (US)

(72) Inventor: Franky Montagna, Bilzen (BE)

(73) Assignee: DRiV Automotive Inc., Southfield, MI (US)

(*) Notice: Subject to any disclaimer, the term of this patent is extended or adjusted under 35 U.S.C. 154(b) by 30 days.

(21) Appl. No.: 17/214,218

(22) Filed: Mar. 26, 2021

(65) Prior Publication Data

US 2021/0301898 A1    Sep. 30, 2021

Related U.S. Application Data

(60) Provisional application No. 63/090,510, filed on Oct. 12, 2020, provisional application No. 63/090,475, (Continued)

(51) Int. Cl.
*F16F 9/32* (2006.01)
*F16F 9/50* (2006.01)
(Continued)

(52) U.S. Cl.
CPC .............. *F16F 9/3235* (2013.01); *F16F 9/19* (2013.01); *F16F 9/3484* (2013.01);
(Continued)

(58) Field of Classification Search
CPC .......... F16F 9/19; F16F 9/3235; F16F 9/3484; F16F 9/3488; F16F 9/50; F16F 2222/12;
(Continued)

(56) References Cited

U.S. PATENT DOCUMENTS 4,484,669 A    11/1984    Kato
5,226,512 A    7/1993    Kanari
(Continued)

FOREIGN PATENT DOCUMENTS

DE         3445684 A1    6/1986
DE    102013223221 B3    3/2015
(Continued)

OTHER PUBLICATIONS

Notification of Transmittal of International Search Report and Written Opinion of International Searching Authority for International Application No. PCT/US2021/024455 dated Jul. 13, 2021 (13 pages).

(Continued)

*Primary Examiner* — Robert A. Siconolfi
*Assistant Examiner* — James K Hsiao
(74) *Attorney, Agent, or Firm* — Bejin Bieneman PLC

(57) ABSTRACT

A damper assembly includes a pressure tube defining a chamber. The damper assembly includes a body supported by the pressure tube. The body has a first surface and a second surface opposite and spaced from the first surface along an axis. The body defines a passage extending from the first surface to the second surface. The damper assembly includes an orifice disc movable from an unflexed position to a first flexed position and movable from the first flexed position to a second flexed position. The orifice disc in the unflexed position is spaced from the first surface radially outward and radially inward of the passage. The orifice disc in the first flexed position is spaced from the first surface radially outward of the passage and abuts the first surface radially inward of the passage. The orifice disc in the second flexed position abuts the first surface radially outward and radially inward of the passage.

20 Claims, 16 Drawing Sheets

Related U.S. Application Data filed on Oct. 12, 2020, provisional application No. 63/001,013, filed on Mar. 27, 2020.

(51) Int. Cl.
*F16F 9/19* (2006.01)
*B60G 13/08* (2006.01)
*F16F 9/348* (2006.01)
*B60G 17/08* (2006.01)

(52) U.S. Cl.
CPC .............. *F16F 9/3488* (2013.01); *F16F 9/50* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/112* (2013.01); *B60G 2800/162* (2013.01); *F16F 2222/12* (2013.01); *F16F 2228/066* (2013.01); *F16F 2230/183* (2013.01); *F16F 2232/08* (2013.01); *F16F 2234/02* (2013.01)

(58) Field of Classification Search
CPC ........... F16F 2228/066; F16F 2230/183; F16F 2232/08; F16F 2234/02; B60G 17/08; B60G 13/08; B60G 2202/24; B60G 2204/62; B60G 2206/41; B60G 2500/112; B60G 2800/162
See application file for complete search history.

(56) References Cited

U.S. PATENT DOCUMENTS

| | | | |
|---|---|---|---|
| 5,316,113 A * | 5/1994 | Yamaoka | F16F 9/3484 188/320 |
| 5,332,069 A | 7/1994 | Murakami | |
| 5,413,195 A | 5/1995 | Murakami | |
| 7,040,462 B2 | 5/2006 | Shinata | |
| 7,322,449 B2 | 1/2008 | Yamaguchi | |
| 7,694,786 B2 | 4/2010 | Asadi et al. | |
| 8,042,661 B2 | 10/2011 | Ota et al. | |
| 9,182,005 B2 | 11/2015 | Goldasz et al. | |
| 9,249,854 B2 * | 2/2016 | Kim | F16F 9/3485 |
| 9,347,512 B2 * | 5/2016 | Yamada | F16F 9/3484 |
| 9,410,595 B2 * | 8/2016 | Yamada | F16F 9/3481 |
| 9,441,699 B2 * | 9/2016 | Lawler | F16F 9/3484 |
| 9,500,251 B2 * | 11/2016 | Rummel | F16F 9/18 |
| 9,777,790 B2 | 10/2017 | Mizuno et al. | |
| 9,845,839 B2 | 12/2017 | Rummel | |
| 10,258,146 B2 * | 4/2019 | Hansen | A47B 9/10 |
| 10,544,852 B2 | 1/2020 | Inagaki et al. | |
| 10,995,813 B2 * | 5/2021 | Yamashita | F16F 9/32 |
| 2005/0056505 A1 * | 3/2005 | Deferme | F16F 9/3485 188/283 |
| 2005/0056506 A1 | 3/2005 | Deferme | |
| 2005/0279597 A1 * | 12/2005 | Yamaguchi | F16F 9/348 188/322.13 |
| 2006/0283676 A1 * | 12/2006 | Deferme | F16F 9/3485 188/322.15 |
| 2007/0034466 A1 * | 2/2007 | Paesmans | B60G 17/08 188/322.22 |
| 2012/0312649 A1 | 12/2012 | Robertson | |
| 2013/0234378 A1 * | 9/2013 | Ericksen | B60G 13/06 267/221 |
| 2014/0048366 A1 | 2/2014 | Lee et al. | |
| 2014/0231199 A1 * | 8/2014 | Kim | F16F 9/34 188/313 |
| 2014/0262655 A1 * | 9/2014 | Tuts | F16F 9/512 188/322.15 |
| 2014/0332332 A1 * | 11/2014 | Lawler | F16F 9/3484 188/313 |
| 2015/0041269 A1 * | 2/2015 | Lim | F16F 9/5126 188/322.15 |
| 2015/0114774 A1 * | 4/2015 | Kim | F16F 9/3485 188/322.15 |
| 2015/0337918 A1 * | 11/2015 | Rummel | B60G 13/08 188/315 |
| 2016/0146286 A1 * | 5/2016 | Rummel | F16F 9/3484 188/313 |
| 2016/0201752 A1 * | 7/2016 | Kim | F16F 9/3415 188/280 |
| 2016/0243917 A1 | 8/2016 | Ankney | |
| 2016/0258504 A1 | 9/2016 | Mizuno et al. | |
| 2016/0356335 A1 * | 12/2016 | Nomura | F16F 9/19 |
| 2017/0241502 A1 * | 8/2017 | Rummel | F16F 9/348 |
| 2018/0355945 A1 | 12/2018 | De Kock | |
| 2019/0226546 A1 | 7/2019 | Förster | |
| 2019/0271373 A1 | 9/2019 | Cox | |
| 2019/0285130 A1 | 9/2019 | Rösseler et al. | |
| 2019/0331193 A1 | 10/2019 | Förster | |
| 2022/0196106 A1 * | 6/2022 | Wimmer | F16F 9/369 |

FOREIGN PATENT DOCUMENTS

| | | |
|---|---|---|
| DE | 102014008993 A1 | 4/2015 |
| DE | 102017207605 A1 | 11/2018 |
| DE | 112017006013 T5 | 9/2019 |
| DE | 112017007198 T5 | 11/2019 |
| EP | 2141382 A1 | 1/2010 |
| EP | 2980442 A1 | 2/2016 |
| ES | 2166315 A1 | 4/2002 |
| KR | 100443884 B1 | 8/2004 |
| WO | 2019069413 A1 | 4/2019 |
| WO | 2019163579 A1 | 8/2019 |

OTHER PUBLICATIONS

Notification of Transmittal of International Search Report and Written Opinion of International Searching Authority for International Application No. PCT/US2021/024430 dated Jul. 13, 2021 (11 pages).
Notification of Transmittal of International Search Report and Written Opinion of International Searching Authority for International Application No. PCT/US2021/024469 dated Jul. 9, 2021 (11 pages).
USPTO Notice of Allowance dated Mar. 17, 2023 for U.S. Appl. No. 17/214,265 (65 pages).

* cited by examiner

DAMPER ASSEMBLY

CROSS-REFERENCE TO RELATED APPLICATIONS

The subject patent application claims priority to and all the benefits of Provisional Patent Application U.S. 63/001,013 filed on Mar. 27, 2020, Provisional Patent Application U.S. 63/090,475 filed on Oct. 12, 2020, and Provisional Patent Application U.S. 63/090,510 filed on Oct. 12, 2020, all three of which are herein incorporated by reference in their entirety.

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

The dampers control movement of the wheels by limiting fluid flow past a piston of the damper. The fluid flows past the piston, e.g., via passages of the piston, when the damper is moved toward a compressed or extended position. The passages may have a fixed opening size. Resistance to movement is provided by the passages limiting an amount of fluid that flows therethrough. The resistance to movement may increase exponentially as movement speed is increased.

Discs may be used to control flow of fluid though the passages, e.g., by flexing or translating to increase or decrease a size of an opening at one end of the passage. Changing the opening size may change force response characteristics of the damper assembly. For example, increasing the opening size may decrease resistance to movement and decreasing the opening size may increase resistance to movement.

SUMMARY

A damper assembly provides variable and tunable resistance and may be configured to provide a desired a responsive force that is resistant to movement of the damper assembly depending on a speed and direction of the movement, e.g., toward an extended or compressed position. For example, one or more orifice discs, check discs, blow off discs, may regulate fluid flow through a passage, e.g., by controlling an amount of area, and a rate of change of such area, though which fluid may flow.

The damper assembly includes a pressure tube defining a chamber. The damper assembly includes a body supported by the pressure tube. The body has a first surface and a second surface opposite and spaced from the first surface along an axis. The body defines a passage extending from the first surface to the second surface. The damper assembly includes an orifice disc movable from an unflexed position to a first flexed position and movable from the first flexed position to a second flexed position. The orifice disc in the unflexed position is spaced from the first surface radially outward and radially inward of the passage. The orifice disc in the first flexed position is spaced from the first surface radially outward of the passage and abuts the first surface radially inward of the passage. The orifice disc in the second flexed position abuts the first surface radially outward and radially inward of the passage.

The orifice disc may include an orifice at the passage.

The orifice disc may include an outer edge and the orifice may extend radially inward from the outer edge.

The orifice may be in fluid communication with the passage when the orifice disc is in the second flexed position.

The damper assembly may include a check disc covering the orifice.

The orifice disc may be between the body and the check disc.

The damper assembly may include a fulcrum disc between the body and the orifice disc.

The fulcrum disc may be radially inward of the passage.

The first surface may include a first portion that extends transversely relative to the axis and a second portion that extends transversely relative to the axis and the first portion.

The first portion of the first surface may extend perpendicular relative to the axis.

The first portion of the first surface may be radially inward of the second portion of the first surface.

The second portion may extend away from the first portion and toward the second surface.

The passage may be at the second portion of the first surface.

The first surface radially inward of the passage may be spaced along the axis from the first surface radially outward of the passage.

The body may divide the chamber into a compression sub-chamber and a rebound sub-chamber, the first surface opposite the compression sub-chamber.

The body may divide the chamber into a compression sub-chamber and a rebound sub-chamber, the first surface opposite the rebound sub-chamber.

The damper assembly may include a spring urging the orifice disc toward the body.

The spring may include a main body spaced from the orifice disc along the axis and an arm, the arm extending radially outward from the main body and toward the orifice disc along the axis.

The orifice disc in the second flexed position may abut the first surface surrounding the passage.

In the present disclosure, and as further described herein, the body defining one or more passages is provided by the exemplary piston described herein. The piston defines one or more passages. Movement of the piston within a working chamber of a pressure tube causes fluid to flow between a compression sub-chamber and a rebound sub-chamber that are on opposite sides of the piston. Such fluid movement may flex discs, e.g., check discs, blow off discs, spring discs, etc., attached to the piston. Flex of the discs attached to the piston controls an opening size of the passages of the piston, regulating fluid flow therethrough and providing variable and tunable resistance to the damper assembly. As an alternative to the piston, the body may be a base attached to an end of the pressure tube of the damper assembly, the base defining one or more passages. The passages defined by the base may provide fluid flow between the working chamber of the pressure tube and a reservoir chamber outside the pressure tube. The base may include the surfaces, features, passages, etc., as described for the piston herein. The various discs described herein may be attached to the base, e.g., as described for the discs attached to the piston, including their orientation, relative positions, etc. The base and the various discs may collectively provide a base valve (or compression valve) assembly that regulates fluid flow between the working chamber and the reservoir chamber. Movement of the piston within the working chamber of the pressure tube may cause fluid to flow between the working chamber and the reservoir chamber via the passages of the base and may flex the discs attached to the base. Flex of the discs attached to the base controls an opening size of the passages of the base, regulating fluid flow therethrough and providing variable and tunable resistance to the damper assembly.

DETAILED DESCRIPTION

Figure 2:
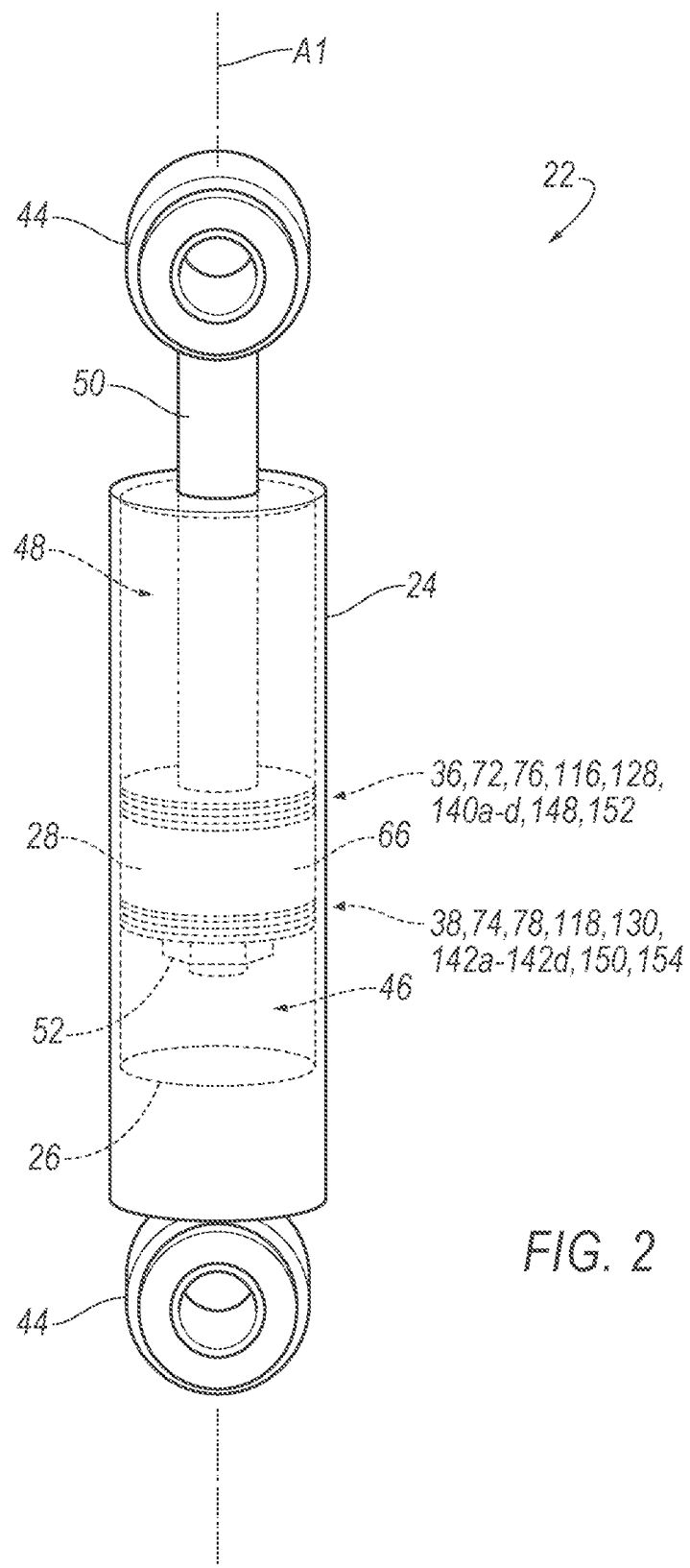
FIG. 2 is a perspective view of one of the damper assemblies.
Figure 3A:
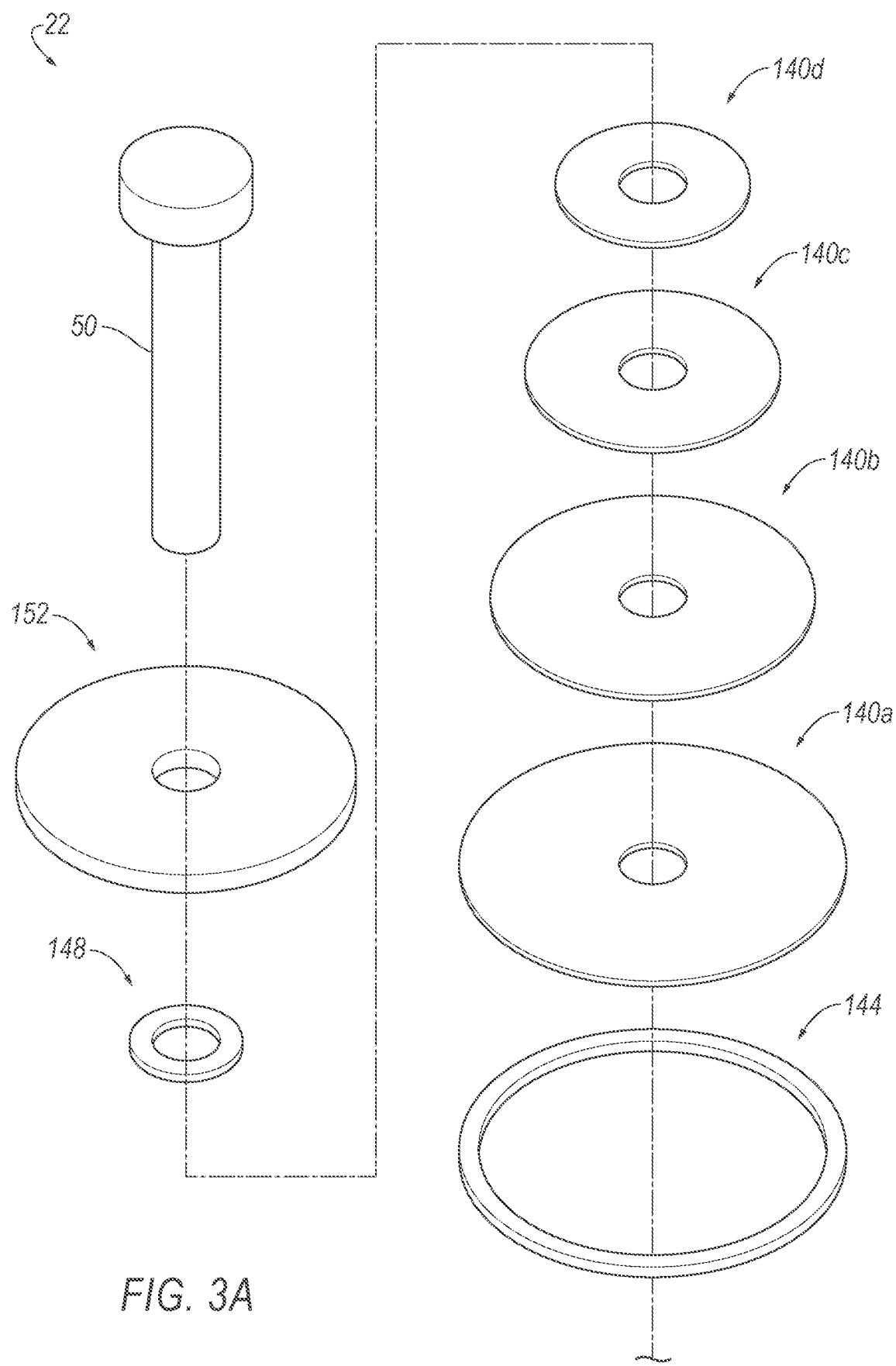
FIG. 3A is an exploded view of components of the damper assembly.
Figure 3B:
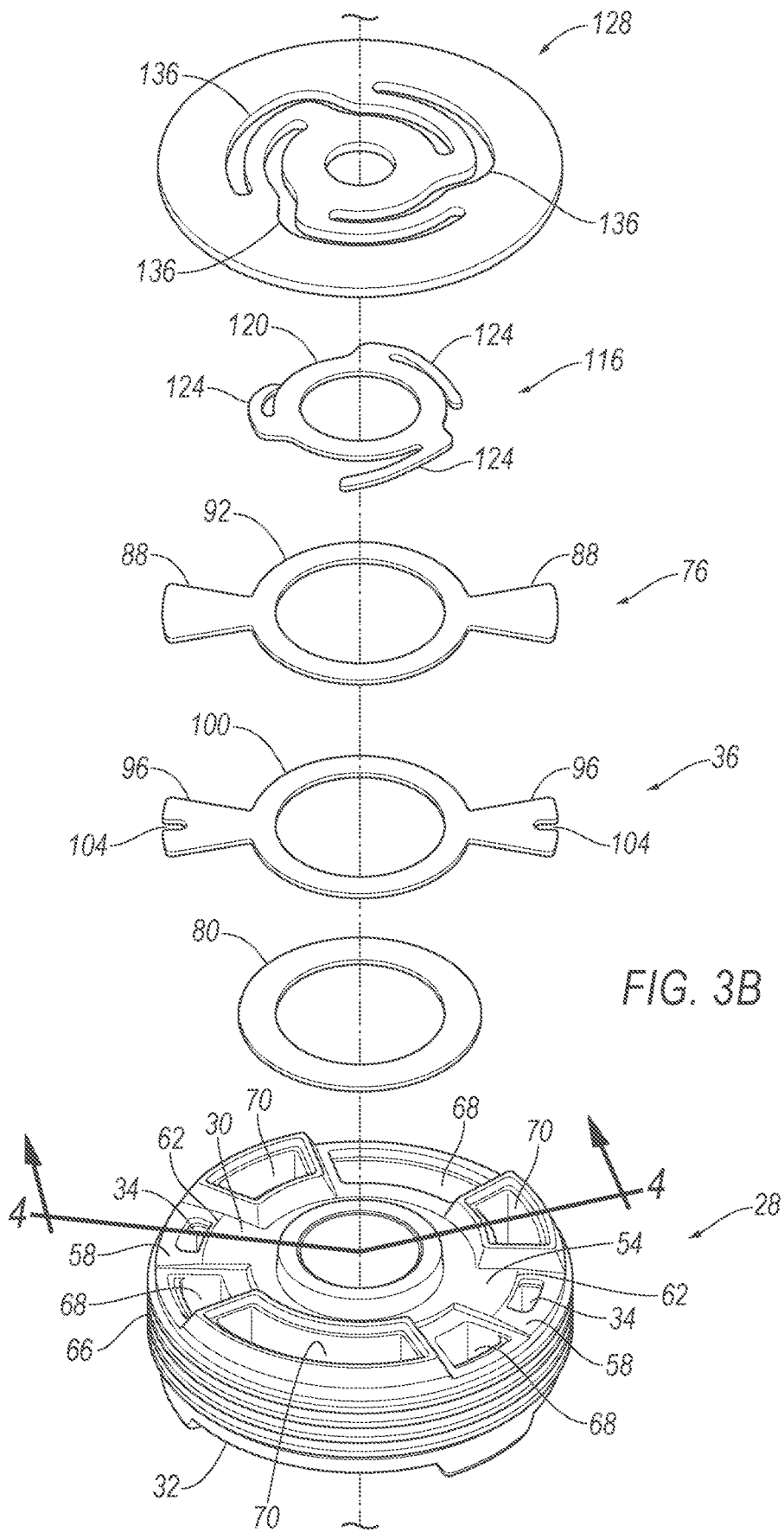
FIG. 3B is a continuation of the exploded view of FIG. 3A.
Figure 3C:
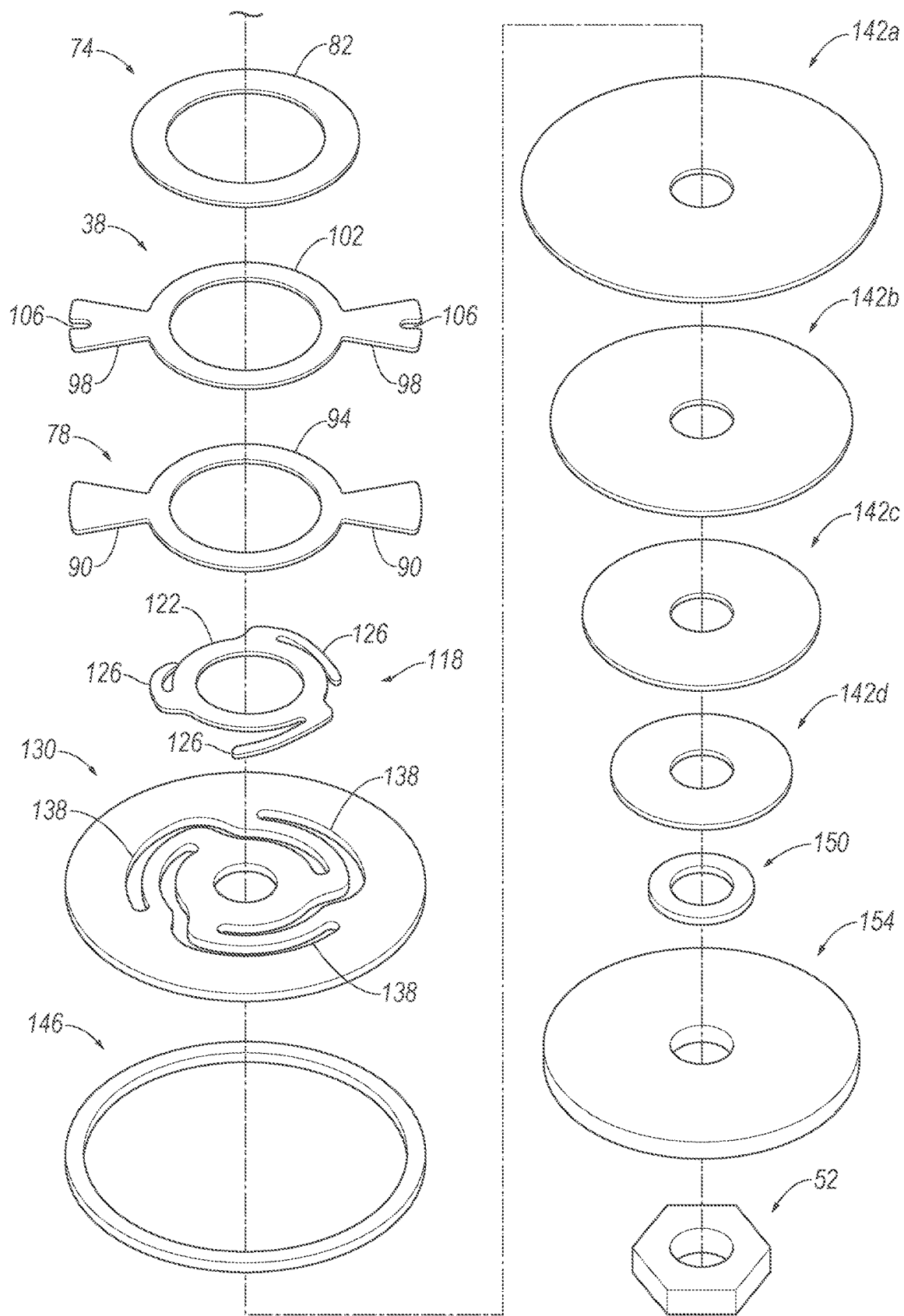
FIG. 3C is a continuation of the exploded view of FIG. 3B.
Figure 4:
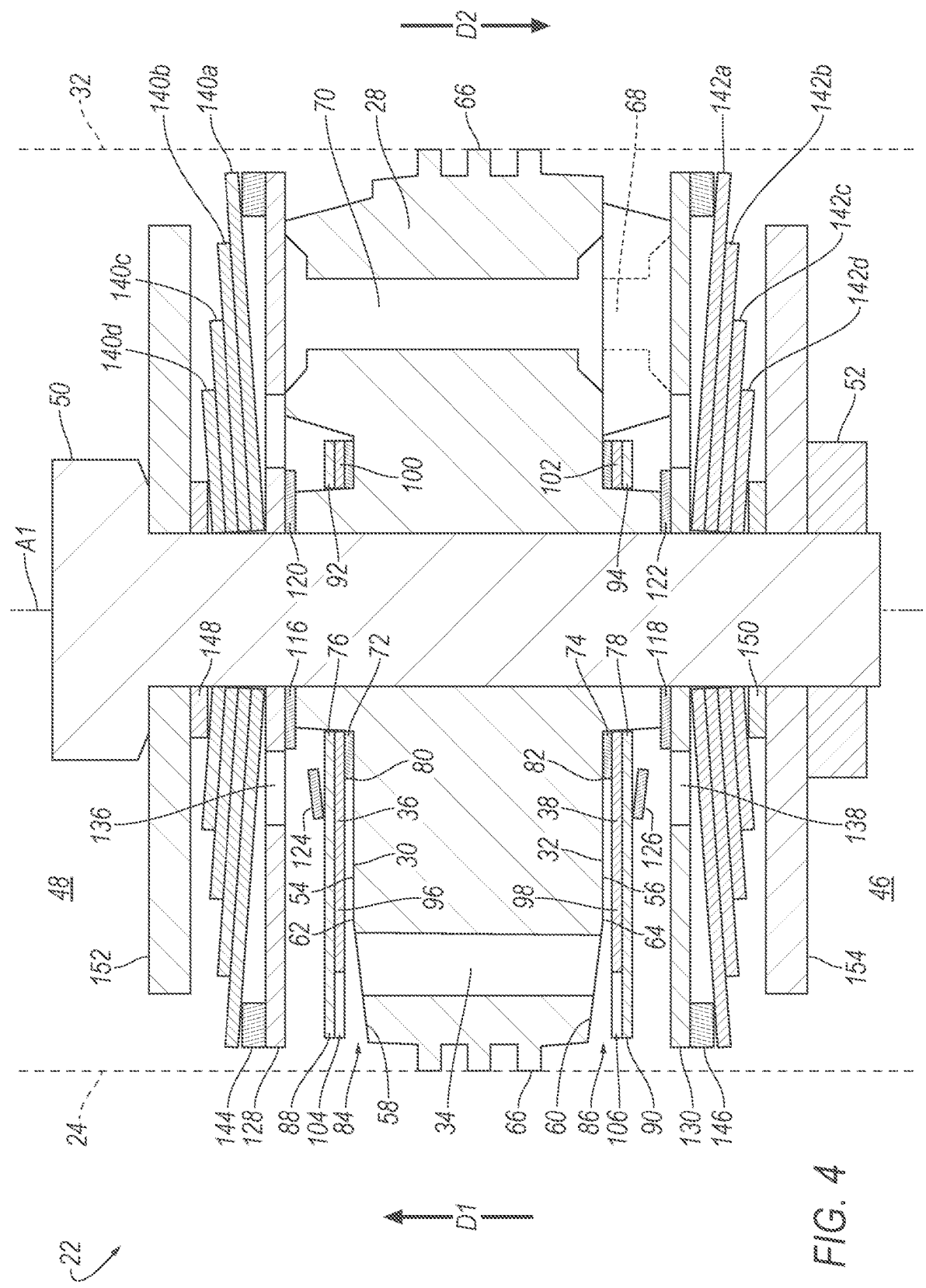
FIG. 4 is a cross-section of a portion of the damper assembly taken along line 4-4 of FIG. 3B.
Figure 5:
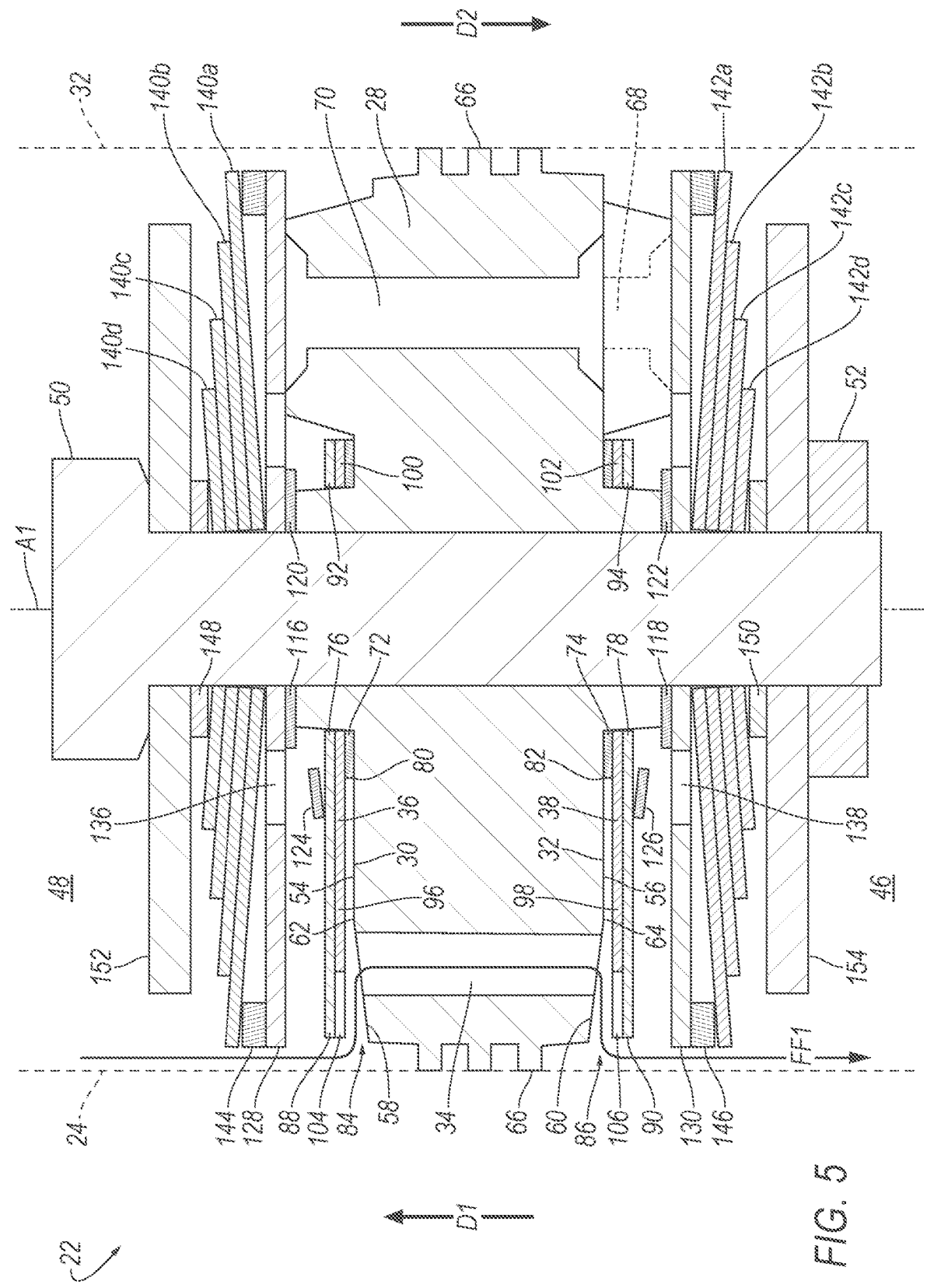
FIG. 5 is the cross section of FIG. 4 and illustrating a first fluid flow path when the damper assembly is moved toward an extended position.
Figure 9:
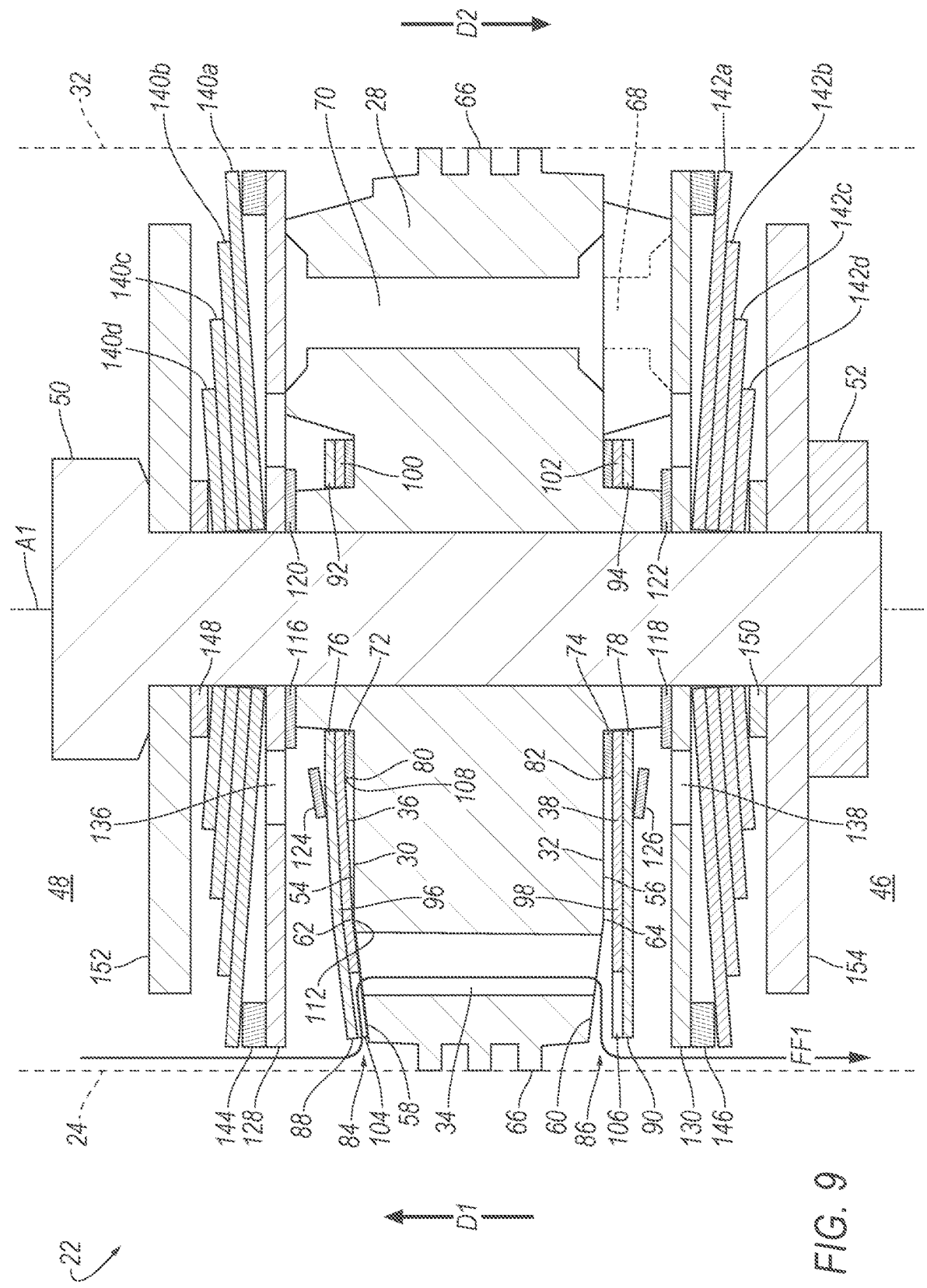
FIG. 9 is the cross section of FIG. 4 and illustrating the first fluid flow path when the damper assembly is moved toward the extended position with a fluid flow rate and/or pressure differential above a second threshold.
Figure 13:
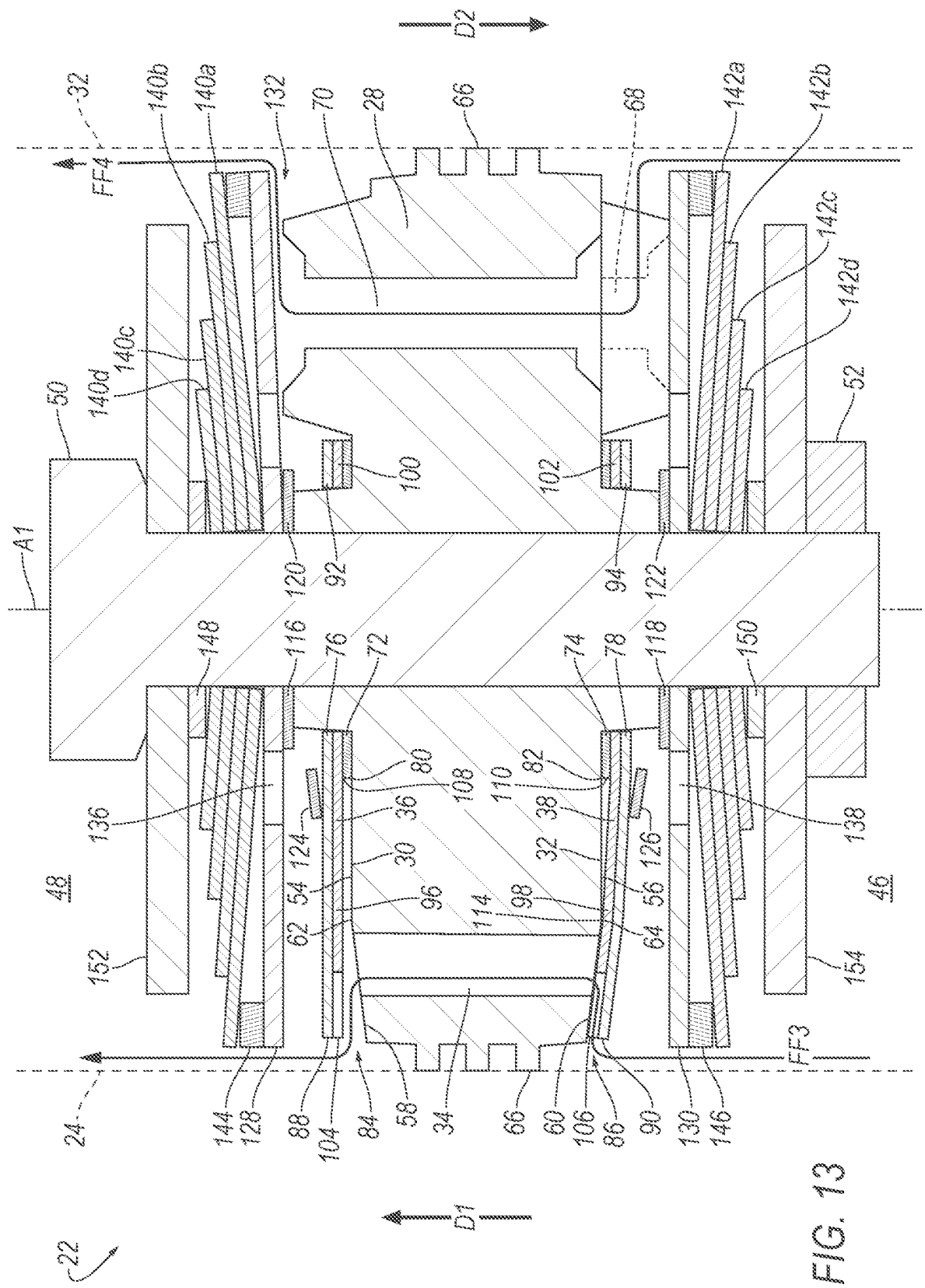
FIG. 13 is the cross section of FIG. 4 and illustrating a third fluid flow path and a fourth fluid flow path when the damper assembly is moved toward a compressed position with a fluid flow rate and/or pressure differential above a second threshold.

With reference to FIGS. 1-4, wherein like numerals indicate like parts throughout the several views, a vehicle 20 may include a plurality of damper assemblies 22. Each damper assembly 22 includes a pressure tube 24 defining a chamber 26. The damper assembly 22 includes a piston 28 slidable within the chamber 26 along an axis A1. The piston 28 includes a first surface 30. The piston 28 includes a second surface 32 opposite and spaced from the first surface 30 along the axis A1. The piston 28 defines a first passage 34 extending from the first surface 30 to the second surface 32. The damper assembly 22 includes an orifice disc 36, 38 movable from an unflexed position to a first flexed position, and movable from the first flexed position to a second flexed position. The orifice disc 36, 38 in the unflexed position is spaced from the piston 28, i.e., from a respective one or the first surface 30 or the second surface 32, radially outward and radially inward of the first passage 34, as shown in FIGS. 4 and 5. The orifice disc 36, 38 in the first flexed position is spaced from the piston 28 radially outward of the first passage 34 and abuts the piston 28 radially inward of the first passage 34, e.g., as shown by the orifice disc 36 in FIG. 7. The orifice disc 36, 38 in the second flexed position abuts the first surface radially outward and radially inward of the first passage 34, as shown in FIGS. 9 and 13. Movement of the orifice disc 36, 38 from the unflexed position to the first flexed position, and from the first flexed position to the second flexed position, provides progressive resistance to movement of damper assembly 22 that varies with respect to a velocity and/or pressure of fluid in the pressure tube 24. For example, the orifice disc 36, 38 may move from the unflexed position to the first flexed position in response to relatively a lower velocity and/or pressure than a velocity and/or pressure required to move the orifice disc 36, 38 from the first flexed position to the second flexed position.

Figure 1:
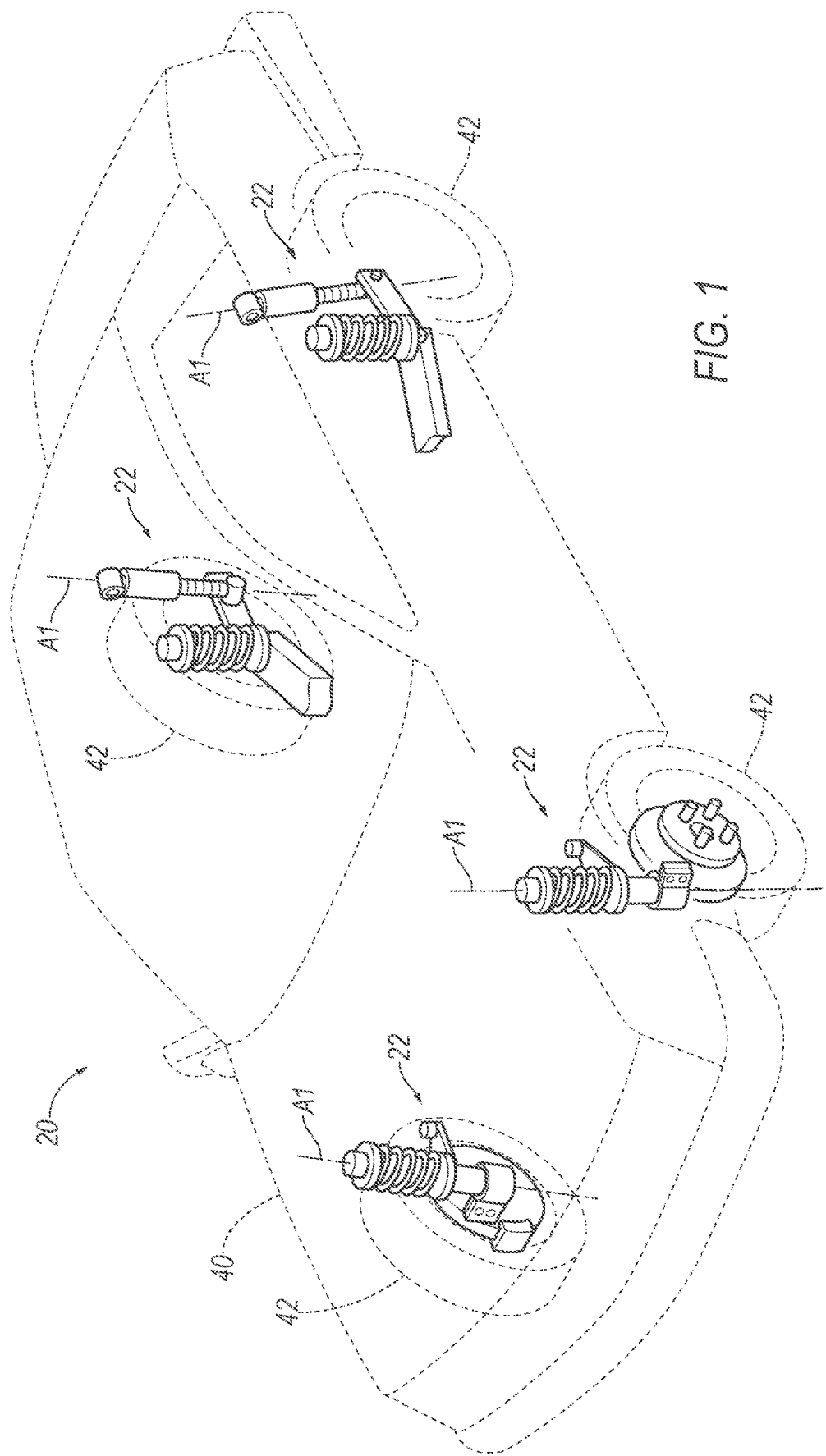
FIG. 1 is a perspective view of a vehicle having a plurality of damper assemblies.

The vehicle 20, illustrated in FIG. 1, may be any type of passenger or commercial vehicle such as a car, a truck, a sport utility vehicle, a crossover vehicle, a van, a minivan, a taxi, a bus, etc. The vehicle 20 includes a body 40 and a frame. The body 40 and frame may be of a unibody construction. In the unibody construction, the body 40, e.g., rockers, serves as the vehicle frame, and the body 40 (including the rockers, pillars, roof rails, etc.) is unitary, i.e., a continuous one-piece unit. As another example, the body 40 and frame may have a body-on-frame construction (also referred to as a cab-on-frame construction). In other words, the body 40 and frame are separate components, i.e., are modular, and the body 40 is supported on and affixed to the frame. Alternatively, the body 40 and frame may have any suitable construction. The body 40 and/or the frame may be formed of any suitable material, for example, steel, aluminum, etc. The vehicle 20 includes wheels 42 that control motion of the vehicle 20 relative to ground supporting the vehicle 20, e.g., acceleration, declaration, turning, etc. Vertical movement of the wheels 42 relative to the body 40 affects an amount of traction between the wheels 42 and the ground and an amount of vertical acceleration experienced by occupants of the vehicle 20 when the vehicle 20 travels over bumps and the like, e.g., the ride feel experienced by the occupants.

The damper assemblies 22 are typically used in conjunction with automotive suspension systems or other suspension systems to control movement of the wheels 42 of the vehicle 20 relative to the body 40 of the vehicle 20. In order to control movement, dampers are generally connected between the sprung (body 40) and the unsprung (suspension/drivetrain) masses of the vehicle 20.

With reference to FIG. 2, the damper assembly 22 is movable from a compressed position to an extended position, and vice versa. A distance between ends 44 of the damper assembly 22 is less in the compressed position than in the extended position. Springs or the like may urge the damper assemblies 22 toward the extended position. Force applied to wheels 42 of the vehicle 20, e.g., from bumps, potholes, etc., may urge to damper assemblies 22 toward the compressed position.

Each damper assembly 22 controls movement of respective wheels 42 by limiting fluid flow into, out of, and/or between working chambers of the dampener, e.g., between a compression sub-chamber 46 and a rebound sub-chamber 48. Fluid movement is caused by a movement of the piston 28 within the pressure tube 24 of the damper assembly 22, e.g., when the damper assembly 22 is moved toward the compressed position or the extended position.

The damper assembly 22 defines the axis A1. The axis A1 extends between the ends 44 of the damper assembly 22. The damper assembly 22 may be elongated along the axis A1. The terms "axially," "radially," and "circumferentially" used herein are relative to the axis A1 defined by the damper assembly 22.

The pressure tube 24 defines the chamber 26. For example, the pressure tube 24 may be hollow and tubular, enclosing the chamber 26 therein. The chamber 26 is filled with fluid, e.g., an incompressible hydraulic fluid. Movement of the damper assembly 22, e.g., to the extended or compressed position, may increase and/or decrease fluid pressure in the pressure tube 24, e.g., in the compression sub-chamber 46 and the rebound sub-chamber 48. The pressure tube 24 may be elongated along the axis A1 of the damper assembly 22. The pressure tube 24 may be metal, or any suitable material.

The damper assembly 22 includes a rod 50 extending away from, and movable relative to, the pressure tube 24. The rod 50 may be elongated along the axis A1 of the damper assembly 22. The rod 50 is moved relative to the pressure tube 24 when the damper assembly 22 is moved toward the compressed position or the extended position. The rod 50 may extend from within the chamber 26 of the pressure tube 24 to outside the chamber 26, e.g., from the piston 28 and through the rebound sub-chamber 48.

The piston 28 divides the chamber 26 of the pressure tube 24 into the compression sub-chamber 46 and the rebound sub-chamber 48, i.e., with the compression sub-chamber 46 on one side of the piston 28 and the rebound sub-chamber 48 on the opposite side of the piston 28 along the axis A1. An outer circumferential surface 66 of the piston 28 may be sealed to an inner surface of the pressure tube 24. The piston 28 is slidable within the chamber 26 of the pressure tube 24 along the axis A1. Sliding the piston 28 along the axis A1 varies volumes of the compression sub-chamber 46 and the rebound sub-chamber 48. For example, a volume of the compression sub-chamber 46 may decrease, and a volume of the rebound sub-chamber 48 may increase, when the damper assembly 22 is moved toward the compressed position. As another example, the volume of the rebound sub-chamber 48 may decrease, and the volume of the compression sub-chamber 46 may increase, when the damper assembly 22 is moved toward the compressed position. The piston 28 is connected to the rod 50, i.e., such that the piston 28 and the rod 50 move generally in unison. The piston 28 may be fixed to the rod 50, e.g., via a fastener 52 and/or other suitable structure such as a weld, friction fit, etc. The piston 28 may be metal, plastic, or any suitable material.

With reference to FIGS. 3A-4, the first surface 30 and the second surface 32 of the piston 28 extend generally radially outward from the rod 50 to the outer circumferential surface 66 of the piston 28. The first surface 30 may be opposite and spaced from the second surface 32 along the axis A1. The second surface 32 may be opposite the compression sub-chamber 46 relative to the piston 28 and along the axis A1. The first surface 30 is opposite the rebound sub-chamber 48 relative to the piston 28 and along the axis A1. For example, the first surface 30 may face the rebound sub-chamber 48 with the second surface 32 between the first surface 30 and the rebound sub-chamber 48. As another example, the second surface 32 may face the compression sub-chamber 46 with the first surface 30 between the second surface 32 and the compression sub-chamber 46.

The first surface 30 and/or the second surface 32 may each include a first portion 54, 56 that extends transversely relative to the axis A1. For example, the first portion 54, 56 of the respective first surface 30 or the second surface 32 may extend away from the rod 50 and perpendicular relative to the axis A1. The axis A1 may extend normally relative to the first portion 54, 56 of the first surface 30 and/or the second surface 32.

The first surface 30 and/or the second surface 32 may each include a second portion 58, 60. The second portion 58, 60 extends transversely relative to the axis A1 and the respective first portion 54, 56. A slope of the first portion 54, 56 is different than a slope of the second portion 58, 60 relative to the axis A1. For example, the second portion 58 of the first surface 30 may extend transversely relative to the first portion 54 of the first surface 30, and the second portion 60 of the second surface 32 may extend transversely relative to the first portion 56 of the second surface 32. The second portion 58, 60 extends away from the respective first portion 54, 56 and toward the first surface 30 or the second surface 32 that is opposite the respective second portion 58, 60. For example, the second portion 58 of the first surface 30 may extend from the first portion 54 toward the second surface 32 relative to the axis A1. The second portion 60 of the second surface 32 may extend from the first portion 56 toward the first surface 30 relative to the axis A1. The second portion 58, 60 is illustrated a linear in cross section extending from the first portion 54, 64. Alternatively, second portion 58, 60 may include a radius, e.g., the second portion 58, 60 of the first surface 30 or the second surface 32 may curve toward the opposite the respective second portion 58, 60. The first portion 54, 56 is radially inward of the respective second portion 58, 60. For example, the first portion 54 of the first surface 30 may be radially between the rod 50 and the second portion 58 of the first surface 30. The first portion 56 of the second surface 32 may be radially between the rod 50 and the second portion 60 of the second surface 32. A distance between the first surface 30 and the second surface 32 along the axis A1 may be less at the second portions 58, 60 than at the first portions 54, 56.

A bend 62, 64 may be defined between the first portion 54, 56 and the second portion 58, 60 of the first surface 30 and/or the second surface 32. The bend 62, 64 is defined by the difference in slope of the first portion 54, 56 and the second portion 58, 60. For example, the bend 62 of the first surface 30 may be defined by the difference in slope of the first portion 54 and the second portion 58 of the first surface 30. As another example, the bend 64 of the second surface 32 may be defined by the difference in slope of the first portion 56 and the second portion 60 of the second surface 32. The bend 62, 64 is radially between the first portion 54, 56 and the second portion 58, 60 of the respective first surface 30 and/or second surface 32. The distance between the second portion 58 of the first surface 30 and the second portion 60 of the second surface 32 along the axis A1 may be greater at the bends 62, 64 than at the outer circumferential surface 66 of the piston 28. The bends 62, 64 are shown as being generally the same difference in slope. Alternately, the bends 62, 64 may be defined by different slopes. For example, the slope of the bend 62 one side of the first surface 30 may be different than the slope of the bend 62 circumferentially opposite (e.g., spaced 180 degrees about the axis A1) such bend 62.

The piston 28 defines one or more passages, e.g., one or more first passages 34, second passages 68, and third passages 70. The passages 34, 68, 70 extend from the first surface 30 of the piston 28 to the second surface 32 of the piston 28. The passages 34, 68, 70 may be spaced circumferentially about the axis A1. The passages 34, 68, 70 provide fluid communication between the compression sub-chamber 46 and the rebound sub-chamber 48 of the pressure tube 24, i.e., such that fluid may flow from the compression sub-chamber 46 to the rebound sub-chamber 48 in a first direction D1, or vice versa in a second direction D2 opposite the first direction D1. The first direction D1 is shown in the drawings as being from the second surface 32 to the first surface 30 however, the first direction D1 may be from the first surface 30 to the second surface 32.

The first passage 34 may be at the second portion 58 of the first surface 30 and/or the second portion 60 of the second surface 32. For example, the first passage 34 may extend from an open end at the second portion 58 of the first surface 30 to an open end at the second portion 60 of the second surface 32. The open ends may be surrounded by the respective second portions 58, 60. The first surface 30 radially inward of the first passage 34 may be spaced along the axis A1 from the first surface 30 radially outward of the first passage 34. The second surface 32 radially inward of the first passage 34 may be spaced along the axis A1 from the second surface 32 radially outward of the first passage 34. For example, a distance along the axis A1 between the first surface 30 and the second surface 32 radially inward of the first passage 34 may be greater than a distance along the axis A1 between the first surface 30 and the second surface 32 radially outward of the first passage 34. The bends 62, 64 may be radially inward of the first passage 34, e.g., the bends 62, 64 may be between the first passage 34 and the rod 50 perpendicular to the axis A1. The bends 62, 64 can also be at the first passages 34 or radially outwards (not shown).

The damper assembly 22 may include one or more fulcrum discs 72, 74, e.g., one fulcrum disc 72 at the first surface 30 and/or one fulcrum disc 74 at the second surface 32. The fulcrum discs 72, 74 provide fulcrum points for the orifice discs 36, 38 and check discs 76, 78. For example, one of the fulcrum discs 72 may abut the first surface 30. Another of the fulcrum discs 74 may abut the second surface 32. The fulcrum discs 72, 74 may extend radially outward from the rod 50 to outer edges 80, 82. The fulcrum discs 72, 74 may be radially inward of the passages 34, 68, 70. For example, the outer edge outer edges 80, 82 of the fulcrum discs 72, 74 may be radially inward of the bends 62, 64.

The damper assembly 22 may include one or more check discs 76, 78, e.g., a check disc 76 at the first surface 30 and a check disc 78 at the second surface 32. The check discs 76, 78 increase a resistance to movement in response to fluid flow past the respective check disc 76, 78 and/or a difference in fluid pressure on one side of the check disc 76, 78 relative to an opposite side. The fluid flow and/or difference in fluid pressure may translate or flex the check disc 76, 78 to decease a size of an opening 84, 86 (illustrated in FIGS. 4, 5, 7, 9, and 11) through which fluid may flow and thereby increase resistance to movement. The check discs 76, 78 may be supported by the piston 28 and/or the rod 50, e.g., via a center opening of each of the check discs 76, 78.

Figure 7:
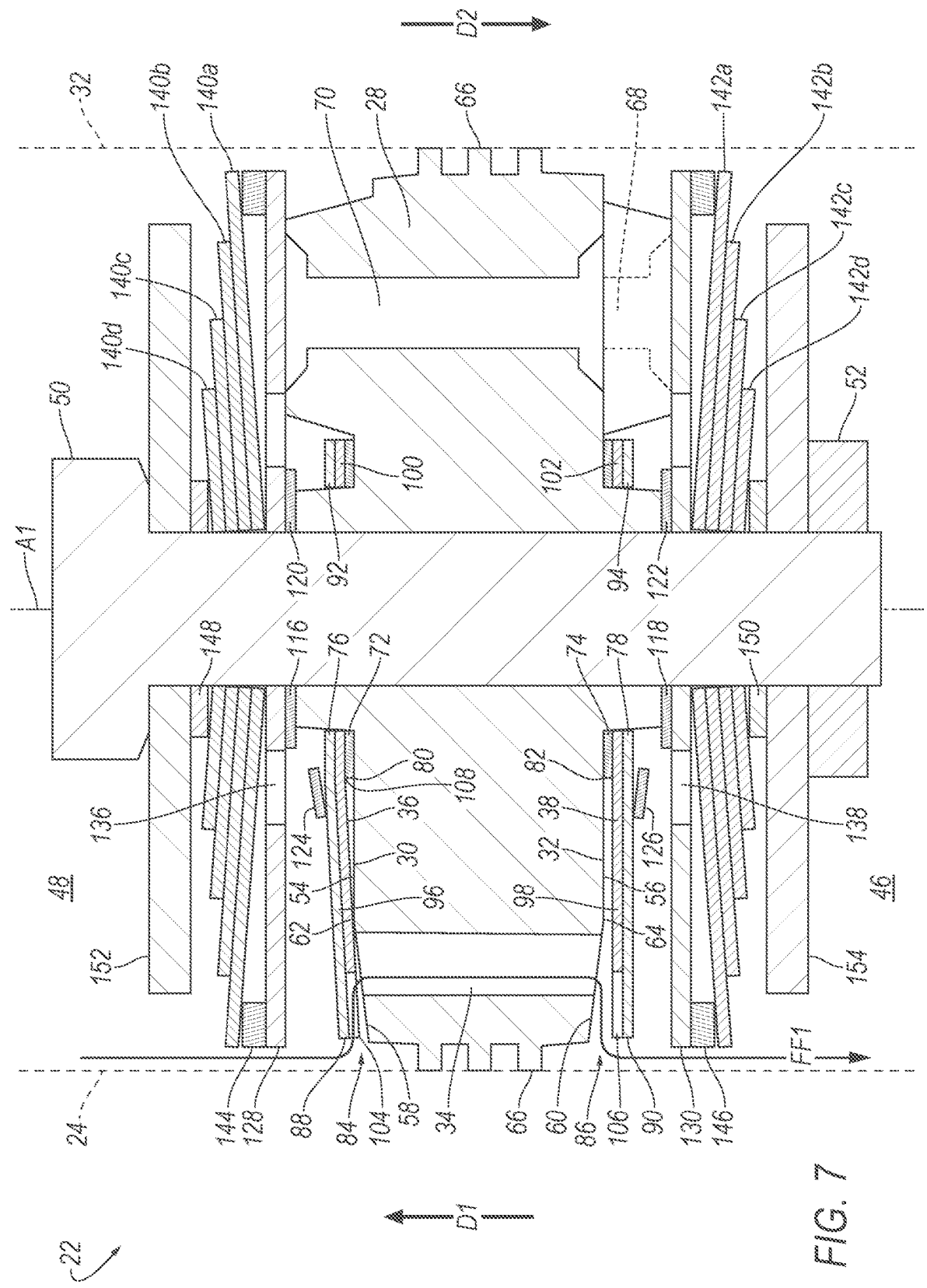
FIG. 7 is the cross section of FIG. 4 and illustrating the first fluid flow path when the damper assembly is moved toward the extended position with a fluid flow rate and/or pressure differential above a first threshold.

The check discs 76, 78 may be movable from an unflexed position illustrated in FIGS. 4 and 5 to a first flexed position illustrated in FIG. 7 (showing the check disc 76 in the first flexed position). The check discs 76, 78 may flex at the respective fulcrum disc 72, 74 when moving from the unflexed position to the first flexed position. The respective opening 84, 86 may be smaller in the first flexed position than in the unflexed position. The check discs 76, 78 may further be movable from the first flexed position to a second flexed position illustrated in FIGS. 9 and 11. The check discs 76, 78 may flex at the respective bend 62, 64 when moving from the first flexed position to the second flexed position. The respective opening 84, 86 may be smaller in the second flexed position than in the first flexed position.

Returning to FIGS. 3A-4, the check discs 76, 78 may include extensions 88, 90 that extend radially outward from a base ring 92, 94 of the respective check disc 76, 78. The extensions 88, 90 may be opposite each other, e.g., spaced from each other at generally 180 degrees around the axis A1. The check discs 76, 78 may be bow-tie shaped. For example, a width of the extensions 88, 90 may increase along the extensions 88, 90, e.g., such that the extensions 88, 90 get wider as the extensions 88, 90 extend away from the respective base ring 92, 94. Although illustrated as each having two extensions 88, 90, the check discs 76, 78 may each include only one, or more than two, extensions 88, 90. The extensions 88, 90 may cover the first passages 34. For example, the extensions 96, 98 may be circumferentially aligned with, and extend radially beyond, the first passages 34.

The amount of flex and/or translation of the check disc 76, 78 (and the associated decrease in size of the opening) may be proportional to a rate of fluid flow and/or a pressure differential between the compression sub-chamber 46 and the rebound sub-chamber 48 of the chamber 26. For example, the greater the rate of fluid flow and/or difference in fluid pressure, the greater the amount of flex and/or translation of the check disc 76, 78. The proportionality of the amount of flex and/or translation of the check disc 76, 78 to the rate of fluid flow and/or pressure differential may vary depending on whether the check disc 76, 78 is moving between the unflexed position and the first flexed position or between the first flexed position and the second flexed position. For example, the amount of fluid flow necessary to move from the unflexed position to the first flexed position is generally less than the amount of fluid flow necessary to move from the first flexed position to the second flexed position.

A threshold rate of fluid flow and/or difference in fluid pressure may be required to flex and/or translate the check discs 76, 78. The check discs 76, 78 may not increase resistance to movement until the threshold rate of fluid flow and/or difference in fluid pressure is achieved. The threshold rate of fluid flow and/or difference in fluid pressure may be determined based on desired response characteristics of the damper assembly 22. The check discs 76, 78 may be designed, e.g., via geometry such as thickness, material type, etc., to flex at the threshold rate of fluid flow and/or difference in fluid pressure. For example, increasing a thickness of the check discs 76, 78 and/or selecting a stiffer material for the check discs 76, 78 may increase the threshold rate of fluid flow and/or difference in fluid pressure required to decrease the size of the openings 84, 86. Decreasing the thickness of the check discs 76, 78 and/or selecting a more flexible material for the check discs 76, 78 may decrease the threshold rate of fluid flow and/or difference in fluid pressure required to decrease the size of the openings 84, 86.

The check disc 76 at the first surface 30 selectively restricts fluid flow through the first passages 34 in the second direction D2, i.e., depending on a direction and an amount of fluid pressure and/or speed of fluid flow applied to the check disc 76. The check disc 78 at the first surface 30 selectively permits fluid through the first passages 34 by controlling a size of the opening 84 between the check disc 76 and the first surface 30 of the piston 28. The check disc 78 at the second surface 32 selectively restricts fluid flow through the first passages 34 in the first direction D1 by controlling a size of the opening 86 between the check disc 78 and the second surface 32 of the piston 28.

When the damper assembly 22 is moved toward the extended position the volume of the compression sub-chamber 46 is increased and the volume of the rebound sub-chamber 48 is decreased, thereby creating a pressure differential where fluid pressure is greater in the rebound sub-chamber 48 than in the compression sub-chamber 46. Such pressure differential and/or fluid flow caused by such pressure differential may move the check disc 76 at the first surface 30 toward the piston 28, decreasing the size of the opening 84 therebetween through which fluid may flow and increasing resistance to motion provided the damper assembly 22.

When the damper assembly 22 is moved toward the compressed position the volume of the compression sub-chamber 46 is reduced and the volume of the rebound sub-chamber 48 is increased, thereby creating a pressure differential where fluid pressure is greater in the compression sub-chamber 46 than in the rebound sub-chamber 48. Such pressure differential, and/or fluid flow caused by such pressure differential, may move the check disc 78 at the second surface 32 toward the piston 28, decreasing the size of the opening 86 therebetween through which fluid may flow and increasing resistance to motion provided the damper assembly 22.

The damper assembly 22 may include one or more orifice discs 36, 38, e.g., one orifice disc 36, at the first surface 30 and/or one orifice disc 36, 38 at the second surface 32. The orifice discs 36, 38 may be supported by the rod 50 and/or the piston 28, e.g., via a center opening of the respective orifice disc 36, 38. The orifice disc 36, 38 may be between the piston 28 and the respective check disc 76, 78, e.g., along the axis A1. One side of the orifice disc 36, 38 may abut the respective fulcrum discs 72, 74, e.g., opposite the piston 28 relative to the axis A1. The fulcrum disc 72, 74 may be between the piston 28 and the respective orifice disc 36, 38 along the axis A1.

The orifice discs 36, 38 may include extensions 96, 98 that extend radially outward from a base ring 100, 102 of the respective orifice disc 36, 38. The extensions 96, 98 may be opposite each other, e.g., spaced from each other at generally 180 degrees around the axis A1. An outer edge of the base ring 100, 102 may be aligned with the outer edge 80, 82 of the respective fulcrum disc 72, 74. For example, the outer edge of the base ring 100, 102 and the outer edge of 80, 82 the respective fulcrum disc 72, 74 may be generally equally spaced from the axis A1. The orifice discs 36, 38 may be bow-tie shaped. For example, a width of the extensions 96, 98 may increase along the extensions 96, 98, e.g., such that the extensions 96, 98 get wider as the extensions 96, 98 extend away from the base ring 100, 102. The extensions 96, 98 of the orifice discs 36, 38 may be aligned with the extensions 88, 90 of the check discs 76, 78, e.g., circumferentially relative to the axis A1. Although illustrated as each having two extensions 96, 98, the orifice discs 36, 38 may each include only one, or more than two, extensions 96, 98. The extensions 96, 98 may cover the first passages 34. For example, the extensions 96, 98 may be circumferentially aligned with, and extend radially beyond, the first passages 34.

Each orifice disc 36, 38 defines one or more orifices 104, 106. The orifices 104, 106 permit fluid flow axially and/or radially relative to the axis A1 of the damper assembly 22. Each orifice 104, 106 may be open in a radial direction. For example, orifices 104, 106 may extend radially inward from outer edges of the extensions 96, 98 of the respective orifice disc 36, 38, e.g., such that fluid may flow radially into the orifices 104, 106 at the outer edges. The orifices 104, 106 of the orifice discs 36, 38 may be at the first passage 34, e.g., generally circumferentially aligned relative to, and generally radially equally spaced from, the open ends of the first passages 34. The check disc 76, 78 may cover the orifice 104, 106. For example, the extension of the check disc 76, 78 may extend circumferentially and radially across the orifice 104, 106. The orifices 104, 106 enable fluid flow through the first passage 34, e.g., by maintaining minimum sizes to the openings 84, 86 between the check discs 76, 78 and piston 28 when the check discs 76, 78 are in the second flexed position. For example, the minimum size of the opening may be equal to a radial flow area of the orifice 104, 106.

The orifice discs 36, 38 are movable from the unflexed position to the first flexed position and movable from the first flexed position to the second flexed position, e.g., in response to fluid flow past the respective orifice disc 36, 38 and as described for the check discs 76, 78. The orifice discs 36, 38 may move concurrently with the check discs 76, 78. For example, movement of the check disc 78 at the second surface 32 from the unflexed position to the first flexed position may urge the orifice disc 38 at the second surface 32 from the unflexed position toward the first flexed position. As another example, movement of the check disc 76 at the first surface 30 from the first flexed position to the second flexed position may urge the orifice disc 36 at the first surface 30 from the first flexed position toward the second flexed position.

The orifice discs 36, 38 in the unflexed positions are spaced from the respective first surface 30 or second surface 32 radially outward and radially inward of the first passage 34. For example, the extensions 96 of the orifice disc 36 at the first surface 30 in the unflexed position may be spaced from the bend 62 and the second portion 58 of the first surface 30. The extensions 98 of the orifice disc 38 at the second surface 32 in the unflexed position may be spaced from the bend 64 and the second portion 60 of the second surface 32. The orifice disc 36, 38 in the unflexed position may be planar and extend generally perpendicular relative to the axis A1.

The orifice discs 36, 38 in the first flexed position are spaced from the respective first surface 30 or second surface 32 radially outward of the first passage 34 and abut the respective first surface 30 or second surface 32 radially inward of the first passage 34. For example, the extensions 96 of the orifice disc 36 at the first surface 30 in the first flexed position may abut the bend 62 and be spaced from the second portion 58 of the first surface 30. The extensions 98 of the orifice disc 38 at the second surface 32 in the first flexed position may abut the bend 64 and be spaced from the second portion 60 of the second surface 32. The orifice disc 36, 38 in the first flexed position may include a first bend 108, 110, e.g., at the fulcrum disc 72, 74 (shown in FIGS. 7, 9, 11, and 13).

The orifice disc 36, 38 in the second flexed position abuts the respective first surface 30 or second surface 32 radially outward and radially inward of the first passage 34. For example, the extensions 96 of the orifice disc 36 at the first surface 30 in the second flexed position may abut the bend 62 and the second portion 58 outward of the first passage 31 at the first surface 30. The extensions 98 of the orifice disc 38 at the second surface 32 in the second position may abut the bend 64 and be spaced from the second portion 60 outward of the first passage 34 at the second surface 32. The orifice disc 36, 38 in the second flexed position may include a second bend 112, 114, e.g., at the bend 62, 64 of the respective first surface 30 or second surface 32. The orifice disc 36, 38 in the second flexed position abuts the respective first surface 30 or second surface 32 surrounding the first passage 34, with the orifice 104, 106 in fluid communication with the first passage 34. Abutting the first surface 30 or second surface 32 surrounding the first passage 34 with the orifice 104, 106 in fluid communication with the first passage 34 inhibits fluid flow into the first passage 34 except via the orifice 104, 106.

The damper assembly 22 may include one or more springs 116, 118, e.g., a spring 116 at the first surface 30 and a spring 118 at the second surface 32. The springs 116, 118 urge the check discs 76, 78, the orifice discs 36, 38, and the fulcrum discs 72, 74 toward the piston 28. For example, the spring 116 at the first surface 30 may compress the check disc 76, the orifice disc 36, and the fulcrum disc 72 against the first surface 30. As another example, the spring 118 at the second surface 32 may compress the check disc 78, the orifice disc 38, and the fulcrum disc 74 against the second surface 32.

Each of the springs 116, 118 may include a main body 120, 122 spaced from the orifice disc 36, 38 along the axis A1. Each of the springs 116, 118 may include a plurality of arms 124, 126 extending circumferentially and radially outward from the main body 120, 122 and toward the respective orifice disc 36, 38 along the axis A1. The springs 116, 118 may be supported by the rod 50, e.g., via a center opening of the main body 120, 122. The springs 116, 118 are made from an elastically deformable material, e.g., spring steel, plastic having suitable elastic properties, etc. The arms 124, 126 of the springs 116, 118 may abut the check discs 76, 78. For example, arms 124 of the spring 116 at the first surface 30 may abut the check disc 76 at the first surface 30 opposite the orifice disc 36 relative to the axis A1. As another example, arms 126 of the spring 118 at the second surface 32 may abut the check disc 78 at the second surface 32 surface opposite the orifice disc 38 relative to the axis A1.

The damper assembly 22 may include one or more blow off discs 128, 130, e.g., a blow off disc 128 at the first surface 30 and/or a blow off disc 130 at the second surface 32. The blow off discs 128, 130 may be supported by the rod 50. For example, each blow off disc 128, 130 may include a center opening and the rod 50 may be in the center openings. The blow off discs 128, 130 may be axially outward of the springs 116, 118 relative to the piston 28. For example, the blow off disc 128 at the first surface 30 may abut the spring 116 opposite the first surface 30. As another example, the blow off disc 130 at the second surface 32 may abut the spring 118 opposite the second surface 32.

The blow off discs 128, 130 decrease a resistance to movement in response to fluid flow past the blow off disc 128, 130 and/or a difference in fluid pressure on one side of the blow off disc 128, 130 relative to an opposite side. The fluid flow and/or difference in fluid pressure may translate or flex the blow off disc 128, 130 to create, and/or increase a size of, an opening 132, 134 (illustrated in FIGS. 11 and 13) through which fluid may flow. Increasing the size of the openings 132, 134 decreases resistance to movement by permitting a greater amount of fluid to flow from one sub-chamber 46, 48 to the other sub-chamber 46, 48. The amount of flex and/or translation of the blow off discs 128, 130 and the resulting increase in size of the openings 132, 134 may be proportional to a rate of fluid flow and/or the pressure difference between the compression sub-chamber 46 and the rebound sub-chamber 48. For example, the greater the rate of fluid flow and/or difference in fluid pressure, the greater the amount of flex and/or translation of the blow off discs 128, 130 away the piston 28, providing a greater magnitude of increase of the size the openings 132, 134 therebetween. A threshold rate of fluid flow and/or difference in fluid pressure may be required to flex and/or translate the blow off discs 128, 130. The blow off discs 128, 130 may not decrease resistance to movement until the threshold rate of fluid flow and/or difference in fluid pressure is achieved.

Each blow off disc 128, 130 may define one or more openings 136, 138. The openings 136, 138 permit fluid flow from one side of the respective blow off disc 128, 130 to another side of the respective blow off disc 128, 130. The openings 136, 138 may decrease a stiffness of the blow off disc 128, 130. The openings 136, 138 may be arranged about the axis A1. The openings 136, 138 of each blow off disc 128, 130 may circumferentially overlap, i.e., two or more openings 136, 138 may be along a common radius extending from the axis A1. Such openings 136, 138 may be spaced from each other along the radius.

The blow off disc 128 at the first surface 30 may be spaced from the first surface 30 at the second passages 68. Spacing the blow off disc 128 from the first surface 30 at the second passages 68 permits fluid to freely flow into and out of the second passages 68, e.g., without inhibition of such flow by the blow off disc 128 at the first surface 30.

The blow off disc 128 at the first surface 30 selectively permits fluid flow out of the third passages 70, i.e., depending on an amount and direction of fluid pressure applied to the blow off disc 128. For example, the blow off disc 128 at the first surface 30 may selectively permit fluid flow through the third passages 70 in the second direction D2. The blow off disc 128 selectively permits fluid flow by controlling the size of the opening 132 between the blow off disc 128 and the first surface 30 of the piston 28 at the third passages 70.

When the damper assembly 22 is in a neutral state, i.e., not moving toward the extended position or the compressed position, the blow off disc 128 at the first surface 30 covers the third passages 70 and restricts or inhibits fluid flow into, and out of, the third passages 70. The blow off disc 128 in the neutral state may abut the first surface 30 of the piston 28 at the third passages 70, e.g., surrounding an open end of the second passage 68.

When the damper assembly 22 is moved toward the compressed position the blow off disc 128 at the first surface 30 may be moved away from the piston 28 by the pressure differential and/or fluid flow resulting from such movement. Moving the blow off disc 128 away from the piston 28 creates the opening 132 between first surface 30 of the piston 28 and the blow off disc 128. Fluid may flow out of the third passages 70 through the opening 132 to the rebound sub-chamber 48.

When the damper assembly 22 is moved toward the extended position the blow off disc 128 at the first surface 30 may be urged toward the piston 28, not creating or enlarging the opening 132 between the first surface 30 of the piston 28 and the blow off disc 128.

The blow off disc 130 at the second surface 32 may be spaced from the second surface 32 at the third passages 70. Spacing the blow off disc 130 from the second surface 32 at the third passages 70 permits fluid to freely flow into and out of the second passages 68, e.g., without inhibition of such flow by the blow off disc 130 at the second surface 32.

The blow off disc 130 at the second surface 32 selectively permits fluid flow out of the second passages 68 of the piston 28, i.e., depending on an amount and direction of fluid pressure applied to the blow off disc 130. For example, the blow off disc 130 at the second surface 32 may selectively permit fluid flow through the second passages 68 in the first direction D1. The blow off disc 130 selectively permits fluid flow by controlling the size of the opening 134 between the blow off disc 130 and the second surface 32 of the piston 28.

When the damper assembly 22 is in the neutral state the blow off disc 130 at the second surface 32 covers the second passages 68 at the second surface 32 and restricts or inhibits fluid flow into, and out of, the second passages 68. The blow off disc 130 in the neutral state may abut the second surface 32 of the piston 28 at the second passages 68, e.g., surrounding open ends of the second passages 68.

When the damper assembly 22 is moved toward the extended position and pressure is greater in the rebound sub-chamber 48 than in the compression sub-chamber 46, the blow off disc 130 at the second surface 32 may be moved away from the piston 28 and create the opening 134 between the second surface 32 and the blow off disc 130. Fluid may flow out of the second passages 68 through the opening 134 to the compression sub-chamber 46.

When the damper assembly 22 is moved toward the compressed position and fluid pressure is greater in the compression sub-chamber 46 in the rebound sub-chamber 48 the blow off disc 130 at the second surface 32 may be urged toward the piston 28, not creating or enlarging the opening 134 between the piston 28 and the blow off disc 130.

The damper assembly 22 may include one or more spring discs 140a-140d, 142a-142d, e.g., one or more spring discs 140a-140d at the first surface 30 and/or one or more spring discs 142a-142d at the second surface 32. The spring discs 140a-140d, 142a-142d may be supported by the rod 50. For example, the rod 50 may extend through center openings of the spring discs 140a-140d, 142a-142d. The spring discs 140a-140d, 142a-142d are elastically deformable. For example, force applied to an outer edge of the spring discs 140a-140d, 142a-142d may cause the spring discs 140a-140d, 142a-142d to flex such that the outer edge is moved axially relative the respective center opening of the spring discs 140a-140d, 142a-142d. The spring discs 140a-140d, 142a-142d are made from an elastically deformable material, e.g., spring steel, plastic having suitable elastic properties, etc.

The spring discs 140a-140d at the first surface 30 urge the blow off disc 128 at the first surface 30 toward the piston 28, i.e., the spring discs 140a-140d increase an amount of force required to flex the blow off disc 128 away from the first surface 30. The spring discs 142a-142d at the second surface 32 urge the blow off disc 130 at the second surface 32 toward the piston 28, i.e., the spring discs 142a-142d increase an amount of force required to flex the blow off disc 130 away from the second surface 32.

The spring discs 140a-140d, 142a-142d may progressively decrease in size as a function of the distance from the piston 28 along the axis A1. For example, the spring disc 140a, 142a closest to the piston 28 may have a larger outer diameter than an outer diameter of the spring disc 140b, 142b adjacent such spring disc 140a, 142a, and so on. The spring disc 140d, 142d farthest from the piston 28 may have a diameter smaller that diameters of the other spring discs 140a-140c, 142a-142c. As another example, the spring discs 140a-140d, 142a-142d may be configured similar to a leaf spring.

The spring discs 140d, 142d closest the piston 28 may abut the respective blow off discs 128, 130 proximate the rod 50. The spring discs 140a, 142a closest the piston 28 may be spaced from the blow off discs 128, 130 at outer edges of the blow off discs 128, 130. For example, a ring 144 at the first surface 30 may be between the spring disc 140a and the blow off disc 128 at the first surface 30 along the axis A1. As another example, a ring 146 at the second surface 32 may be between the spring disc 142a and the blow off disc 130 at the second surface 32 along the axis A1. The rings 144, 146 may be circular or any suitable shape. The rings 144, 146 may be metal, plastic, or any suitable material. The rings 144, 146 provide internal preload forces to the spring discs 140a-140d, 142a-142d. The rings 144, 146 may be radially outward of the openings 136, 138 of the blow off discs 128, 130.

Each damper assembly 22 may include a pair of second fulcrum discs 148, 150. The second fulcrum discs 148, 150 provide fulcrum points for the spring discs 140a-140d, 142a-142d. For example, one of the second fulcrum discs 148 may abut the smallest spring disc 140d at the first surface 30 opposite the adjacent larger spring disc 140c. Such second fulcrum disc 148 may have a smaller outer diameter than the abutting smallest spring disc 140d. As another example, the second fulcrum disc 150 at the second surface 32 may abut the smallest spring disc 142d at the second surface 32 opposite the adjacent larger spring disc 142c. Such second fulcrum disc 150 may have a smaller outer diameter than the smallest spring disc 142d at the second surface 32.

Each damper assembly 22 may include a pair of preload spacers 152, 154. The preload spacers 152, 154 protect the spring discs 140a-140d, 142a-142d. The preload spacers 152, 154 sandwich the piston 28, the discs, and other components of the damper assembly 22 supported by the rod 50. A thickness of the preload spacers 152, 154 may increase or decrease space available for the discs, the piston 28, etc. For example, the preload spacer 152 at the first surface 30 may be axially outboard of the second fulcrum disc 148 at the first surface 30 and the preload spacer 154 at the second surface 32 may be axially outboard of the second fulcrum disc 150 at the second surface 32. The fastener 52 may be fixed to the rod 50 axially outboard of the preload spacer 152 at the second surface 32. The fastener 52 may be, for example, a threaded lock nut. The fastener 52 may confine the preload spacers 152, 154, the blow off discs 128, 130, the spring discs 140a-140d, 142a-142d, the piston 28, etc., to a stack having a predetermined length.

With reference to FIG. 5, a first fluid flow path FF1 defined by the damper assembly 22 is illustrated. The first fluid flow path FF1 is defined when the damper assembly 22 is moved toward the extended position. The first fluid flows path extends from the rebound sub-chamber 48 around the preload spacer 152, the spring discs 140a-140d, and the blow off disc 128 to the opening 84 between the check disc 76 and the first surface 30 of the piston 28. From the openings 84, the first fluid flow path FF1 extends through first passages 34 and out the openings 86 between the check disc 78 and the second surface 32 to the compression sub-chamber 46

The first fluid flow path FF1 defines an area, e.g., perpendicular to the first fluid flow path FF1, through which fluid may flow. The defined area may be at narrowest portion of the respective first fluid flow path FF1. The defined area may include multiple areas. For example, the first fluid flow path FF1 may split into multiple sub-paths, e.g., with each sub-path extending through one of the first passages 34. The sub-paths may each have a sub-area at a narrowest portion of the respective sub-path, and the defined area of the first fluid flow path FF1 may be a combination of the areas of the sub-paths.

Figure 6:
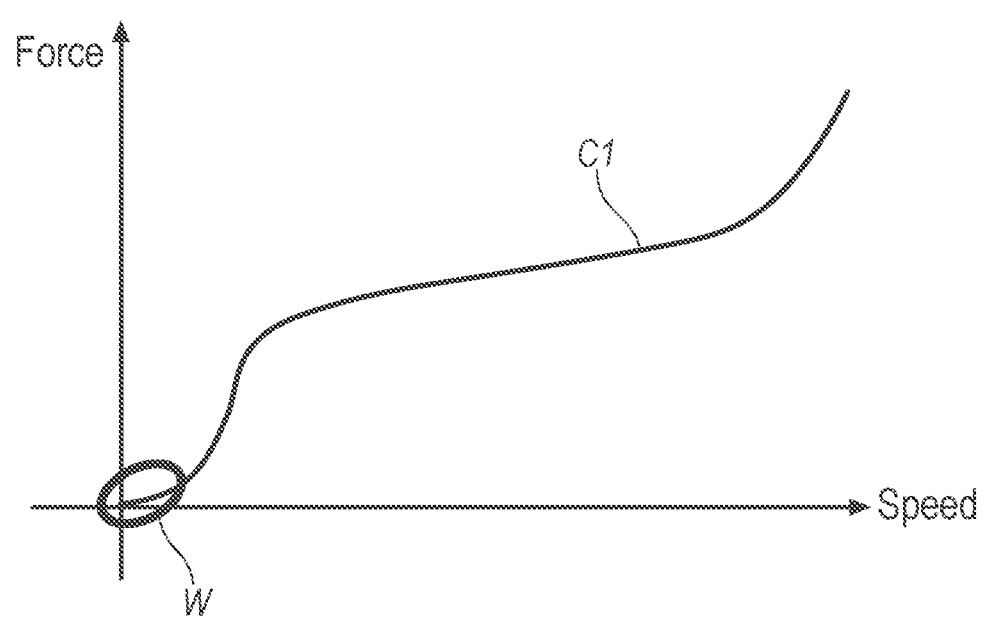
FIG. 6 is an illustration of a force response curve of the damper assembly moving toward the extended position, the illustration identifying a first portion of the curve.

When the fluid flow rate and/or pressure differential between the compression sub-chamber 46 and the rebound sub-chamber 48 is less than a first threshold, e.g., bleed flow, the areas defined by the first fluid flow path FF1 provides resistance to movement of the piston 28 by limiting a rate at which fluid may flow from the rebound sub-chamber 48 to the compression sub-chamber 46. Such resistance is illustrated in FIG. 6 by a section W of a curve C1. The check disc 76 at the first surface 30 may be in the unflexed position when the fluid flow rate and/or pressure differential is less than the first threshold.

Figure 8:
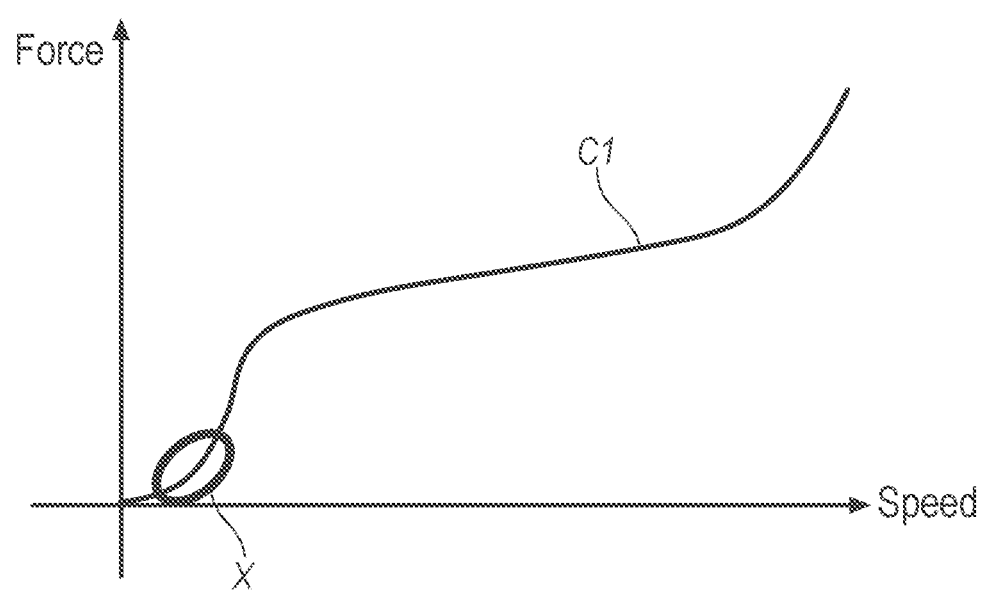
FIG. 8 is an illustration of the force response curve of the damper assembly moving toward the extended position, the illustration identifying a second portion of the curve.

With reference to FIG. 7, the damper assembly 22 is illustrated as moved toward the extended position when the fluid flow rate and/or the pressure differential between the rebound sub-chamber 48 and the compression sub-chamber 46 are greater than the first threshold. When the fluid flow rate and/or the pressure differential are greater than the first threshold, the fluid flow along the first fluid flow path FF1 moves the check disc 76 towards the first surface 30 of the piston 28 to the first flexed position, e.g., into abutment with the bend 62. Moving the check disc 78 toward the piston 28 decreases the size of the opening 84 between the check disc 76 and the first surface 30. Resistance provided by decreasing the size of the opening 84 is illustrated in FIG. 8 by a section X of a curve C1.

Figure 10:
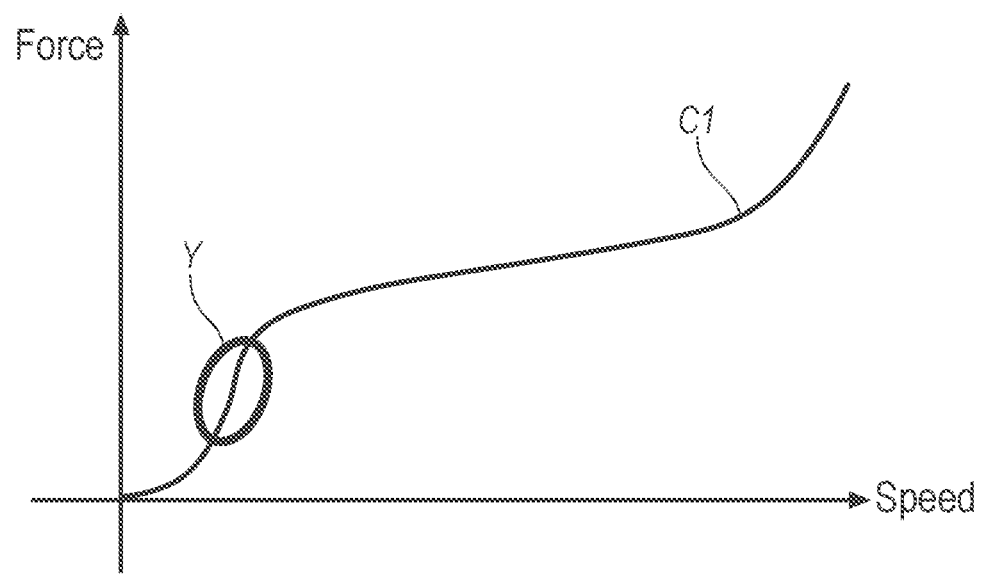
FIG. 10 is an illustration of the force response curve of the damper assembly moving toward the extended position, the illustration identifying a third portion of the curve.

With reference to FIG. 9, the damper assembly 22 is illustrated as moved toward the extended position when the fluid flow rate and/or the pressure differential between the rebound sub-chamber 48 and the compression sub-chamber 46 are greater than a second threshold. The second threshold is greater than the first threshold. When the fluid flow rate and/or the pressure differential are greater than the second threshold, the fluid flow along the first fluid flow path FF1 further moves the check disc 76 towards the first surface 30 of the piston 28 to the second flexed position, e.g., into abutment with the second portion 58 of the first surface 30 surrounding the first passage 34. Moving the check disc 76 to the second flexed position minimizes the size of the opening 86, e.g., to be generally equal to the radial flow area of the orifice 106 of the orifice disc 38. Decreasing and/or minimizing the size of the opening 86 decreases the defined area of the first fluid flow path FF1 and increases resistance to movement of the respective damper assembly 22 by reducing the rate at which fluid may flow from the rebound sub-chamber 48 to the compression sub-chamber 46. Such resistance is illustrated in FIG. 10 by a section Y of the curve C1.

The second threshold may be such that a magnitude of the curve C1 reaches a predetermined amount of response force within a predetermined amount of time. The first threshold may be such to control a shape of the curve C1, e.g., a radius of curvature, between the section X and the section Y of the curve C1. The predetermined amounts may be based on empirical testing, e.g., to optimize vehicle 20 performance and/or occupant comfort.

Figure 11:
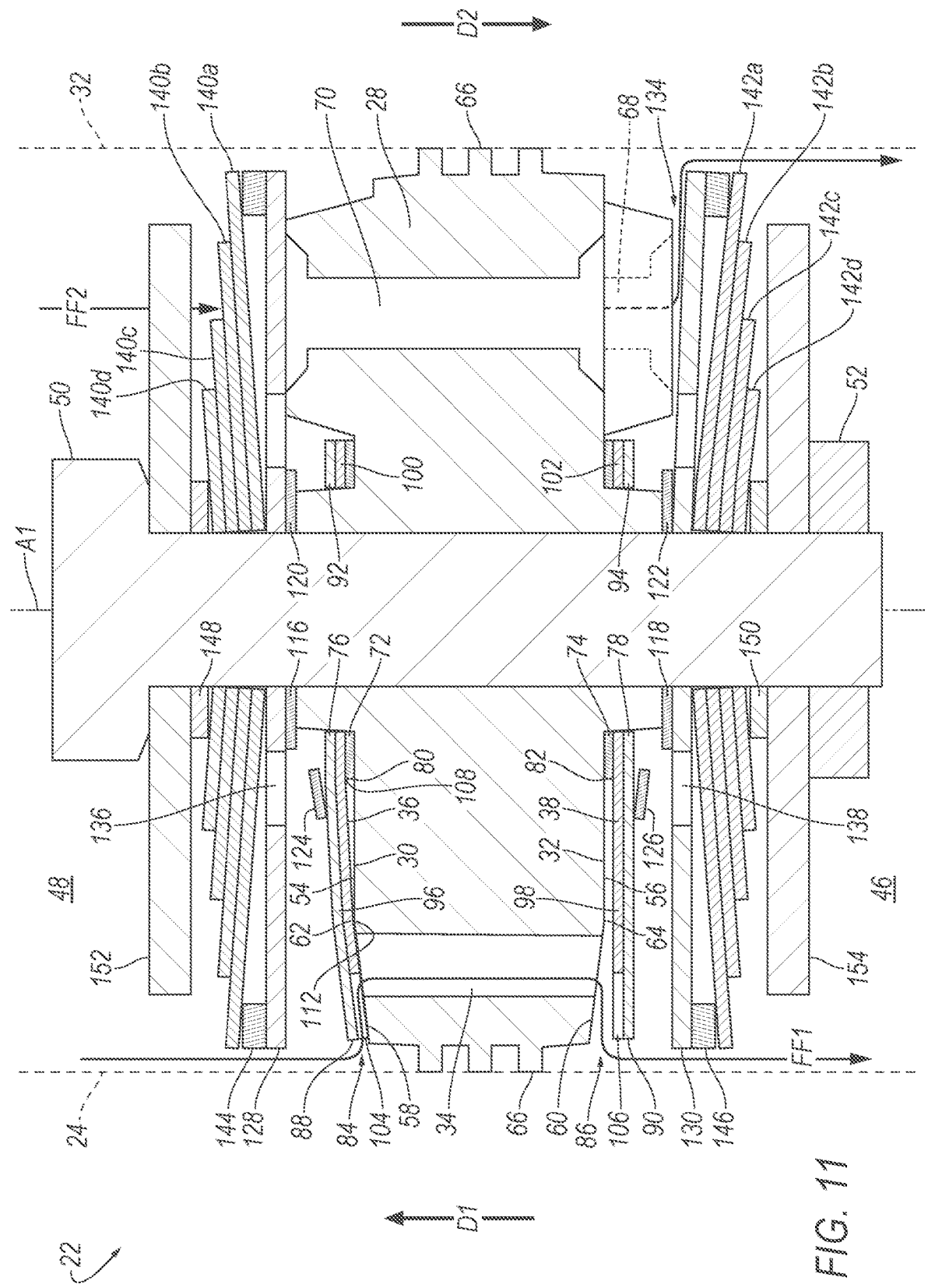
FIG. 11 is the cross section of FIG. 4 and illustrating the first fluid flow path and a second fluid flow path when the damper assembly is moved toward the extended position with the fluid flow rate and/or pressure differential above a third threshold.

With reference to FIG. 11, a second fluid flow FF2 path defined by the damper assembly 22 is illustrated. The second fluid flow FF2 path is defined when the respective damper assembly 22 is moved toward the extended position and the fluid flow rate and/or the pressure differential between the compression sub-chamber 46 and the rebound sub-chamber 48 is greater than a third threshold. The third threshold may be greater than the first and second thresholds such that a slope and/or magnitude of the curve C1 does not exceed a predetermined amount. The predetermined amount may be based on empirical testing, e.g., to optimize vehicle 20 performance and/or occupant comfort.

When the fluid flow rate and/or pressure differential is above the third threshold the blow off disc 130 and the spring discs 142a-142d at the second surface 32 are urged away from the piston 28 and the opening 134 therebetween is created. The second fluid flow FF2 path extends from the rebound sub-chamber 48 to the compression sub-chamber 46 via the second passages 68 and the opening 134 between the second surface 32 of the piston 28 and the blow off disc 128. The second fluid flow FF2 path defines an area through which fluid may flow. The defined area of the second fluid flow FF2 path may include multiple sub-areas.

Figure 12:
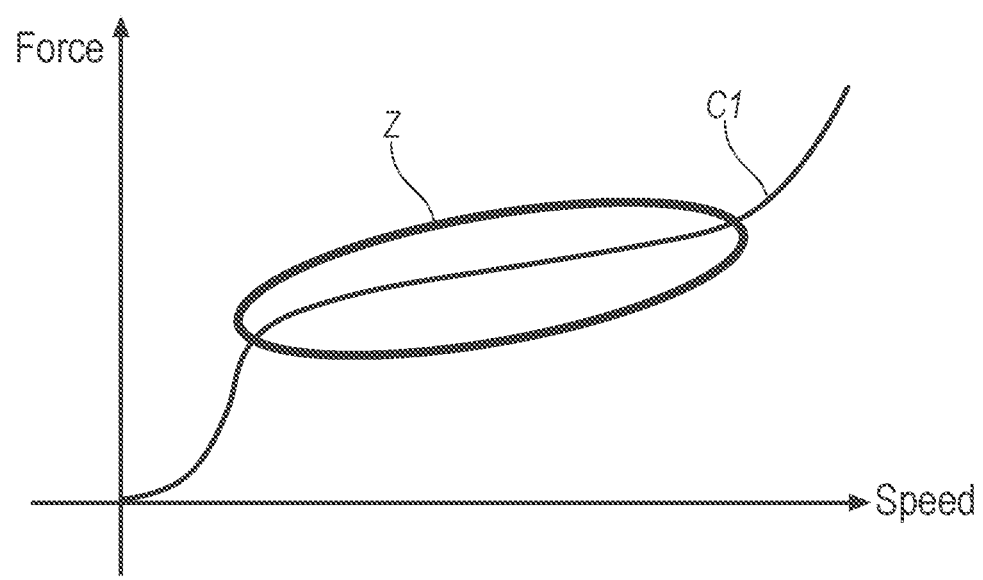
FIG. 12 is an illustration of a force response curve of the damper assembly moving toward the extended position, the illustration identifying a fourth portion of the curve.

The combined defined areas of the first fluid flow path FF1 and the second fluid flow FF2 path reduce resistance to movement of the respective damper assembly 22 (relative to the defined area of just the first fluid flow path FF1) by increasing a rate at which fluid may flow from the rebound sub-chamber 48 to the compression sub-chamber 46. Such resistance is illustrated in FIG. 12 by a section Z of the curve C1.

With reference to FIG. 13, a third fluid flow path FF3 and a fourth fluid flow path FF4 defined by the damper assemblies 22 are illustrated. The third and fourth fluid flow paths FF3, FF4 may be defined when the damper assembly 22 is moved toward the compressed position.

The third fluid flow path FF3 extends from the compression sub-chamber 46 48 to the rebound sub-chamber via the first passages 34 and the openings 86 between the check disc 78 and second surface 32 of the piston 28. FIG. 13 illustrates the check disc 78 in the second flexed position when the fluid flow rate and/or the pressure differential between the compression sub-chamber 46 and the rebound sub-chamber 48 is above the second threshold.

The fourth fluid flow path extends from the compression sub-chamber 46 to the rebound sub-chamber 48 via the third passages 70 and the opening 132 between the blow off disc 130 and the second surface 32 of the piston 28. The fourth fluid flow path may be defined when the damper assembly 22 is moved toward the compressed position and the fluid flow rate and/or the pressure differential between the compression sub-chamber 46 and the rebound sub-chamber 48 is above the third threshold.

Figure 14:
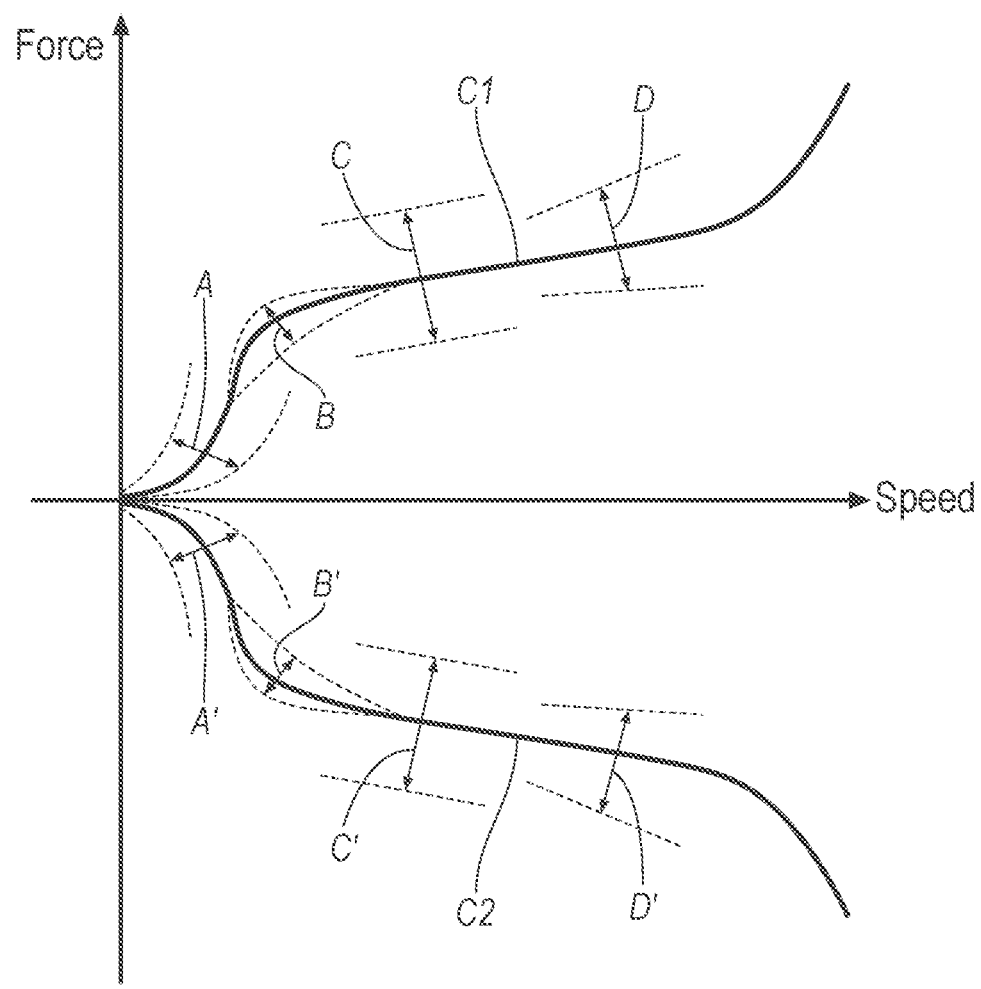
FIG. 14 is an illustration of the force response curve of the damper assembly moving toward the extended position and a force response curve of the damper assembly moving toward the compressed position.

With reference to FIG. 14, the curve C1 and a curve C2 are shown. The curve C1 indicates response force provided by the damper assembly 22 moving toward the extended position at increased speeds. The curve C2 indicates response force provided by the damper moving toward the compressed position at increased speeds. The various components of the damper assembly 22 may be configured to control the curves C1, C2, i.e., to control an amount of responsive force provided by the damper assembly 22 at various speeds.

The curves C1, C2 may be increased or decreased in slope and/or in magnitude proximate arrows A and A', e.g., providing tuning for low speed movement of the damper assembly 22. For example, increasing a steepness of the slope of the second portion 58 of the first surface 30, increasing a thickness of the fulcrum disc 72, increasing a stiffness of the check disc 76, and/or increasing a size of the orifice 104 of the orifice disc 36 may decrease the slope and/or magnitude of the curve C1 proximate arrow A. Similarly increasing a steepness of the slope of the second portion 60 of the second surface 32, increasing a thickness of the fulcrum disc 74, increasing a stiffness of the check disc 78, and/or increasing a size of the orifice 106 of the orifice disc 38 may decrease the slope and/or magnitude of the curve C2 proximate arrow A'. As another example, decreasing a steepness of the slope of the second portion 58 of the first surface 30, decreasing a thickness of the fulcrum disc 72, decreasing the stiffness of the check disc 76, and/or decreasing the size of the orifice 104 of the orifice disc 36 may increase the slope and/or magnitude of the curve C1 proximate arrow A. Similarly decreasing a steepness of the slope of the second portion 60 of the second surface 32, decreasing the thickness of the fulcrum disc, 74 decreasing the stiffness of the check disc 78, and/or decreasing the size of the orifice 1106 of the orifice disc 38 may increase the slope and/or magnitude of the curve C2 proximate arrow A'.

The curves C1, C2 may be increased or decreased in slope and/or in magnitude proximate arrows B and B'. For example, increasing a stiffness of the blow off disc 130 at the second surface 32 may increase the slope and/or magnitude of the curve C1 proximate arrow B. Similarly, increasing a stiffness of the blow off disc 128 at the first surface 30 may increase the slope and/or magnitude of the curve C2 proximate arrow B'.

The curves C1, C2 may be increased or decreased in slope and/or in magnitude proximate arrows C and C', e.g., providing tuning for mid speed movement of the damper assembly 22. For example, decreasing a thickness of the rings 144, 146 may decrease the slope and/or magnitude of the curve C1 proximate arrow C and arrow C'. As another example, increasing the thickness of the rings 144, 146 may increase the slope and/or magnitude of the curve C1 proximate arrow C and arrow C'.

The curves C1, C2 may be increased or decreased in slope and/or in magnitude proximate arrows D and D'. For example, increasing a stiffness of the spring discs 142a-142d at the second surface 32 may increase the slope and/or magnitude of the curve C1 proximate arrow D. Similarly, increasing a stiffness of the spring discs 140a-140d at the first surface 30 may increase the slope and/or magnitude of the curve C2 proximate arrow D'. As another example, decreasing the stiffness of the spring discs 142a-142d at the second surface 32 may decrease the slope and/or magnitude of the curve C1 proximate arrow D. Similarly, decreasing the thickness of the spring discs 140a-140d at the first surface 30 may decrease the slope and/or magnitude of the curve C2 proximate arrow D'.

Although the curves C1, C2 proximate the various arrows A, A', B, B', C, C', D, D' are described individually, the curves C1, C2 may be controlled based on a cumulative effect of the configuration of the various components. For example, configuring the damper assembly 22 20 to control the curves C1, C2 proximate arrows A, A', may also change the curves C1, C2, proximate the other arrows B, B', C, C', D, D'.

The adjectives "first," "second," and "third" are used as identifiers and are not intended to indicate significance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
a pressure tube defining a chamber;
a body supported by the pressure tube, the body having a first surface and a second surface opposite and spaced from the first surface along an axis, the body defining a passage extending from the first surface to the second surface; and
an orifice disc movable from an unflexed position to a first flexed position and movable from the first flexed position to a second flexed position;
the orifice disc in the unflexed position is spaced from the first surface radially outward and radially inward of the passage;
the orifice disc in the first flexed position is spaced from the first surface radially outward of the passage and abuts the first surface radially inward of the passage; and
the orifice disc in the second flexed position abuts the first surface radially outward and radially inward of the passage.

2. The damper assembly of claim 1, wherein the orifice disc includes an orifice at the passage.

3. The damper assembly of claim 2, wherein the orifice disc includes an outer edge and the orifice extends radially inward from the outer edge.

4. The damper assembly of claim 2, wherein the orifice is in fluid communication with the passage when the orifice disc is in the second flexed position.

5. The damper assembly of claim 2, further comprising a check disc covering the orifice.

6. The damper assembly of claim 5, wherein the orifice disc is between the body and the check disc.

7. The damper assembly of claim 1, further comprising a fulcrum disc between the body and the orifice disc.

8. The damper assembly of claim 7, wherein the fulcrum disc is radially inward of the passage.

9. The damper assembly of claim 1, wherein the first surface includes a first portion that extends transversely relative to the axis and a second portion that extends transversely relative to the axis and the first portion.

10. The damper assembly of claim 9, wherein the first portion of the first surface extends perpendicular relative to the axis.

11. The damper assembly of claim 9, wherein the first portion of the first surface is radially inward of the second portion of the first surface.

12. The damper assembly of claim 9, wherein the second portion extends away from the first portion and toward the second surface.

13. The damper assembly of claim 9, wherein the passage is at the second portion of the first surface.

14. The damper assembly of claim 1, wherein the first surface radially inward of the passage is spaced along the axis from the first surface radially outward of the passage.

15. The damper assembly of claim 1, wherein the body divides the chamber into a compression sub-chamber and a rebound sub-chamber, the first surface opposite the compression sub-chamber.

16. The damper assembly of claim 1, wherein the body divides the chamber into a compression sub-chamber and a rebound sub-chamber, the first surface opposite the rebound sub-chamber.

17. The damper assembly of claim 1, further comprising a spring urging the orifice disc toward the piston.

18. The damper assembly of claim 16, wherein the spring includes a main body spaced from the orifice disc along the axis and an arm, the arm extending radially outward from the main body and toward the orifice disc along the axis.

19. The damper assembly of claim 1, wherein the orifice disc in the second flexed position abuts the first surface surrounding the passage.

20. The damper assembly of claim 1, wherein the body is a piston.

\* \* \* \* \*